(12) United States Patent
Hein

(10) Patent No.: US 8,412,741 B2
(45) Date of Patent: Apr. 2, 2013

(54) PRODUCT NETWORK MANAGEMENT SYSTEM AND METHOD

(75) Inventor: Raymond Hein, San Jose, CA (US)

(73) Assignee: Agile Software Corporation, San Jose, CA (US)

( * ) Notice: Subject to any disclaimer, the term of this patent is extended or adjusted under 35 U.S.C. 154(b) by 1380 days.

(21) Appl. No.: 11/779,039

(22) Filed: Jul. 17, 2007

(65) Prior Publication Data

US 2009/0024647 A1 Jan. 22, 2009

(51) Int. Cl.
*G06F 7/00* (2006.01)
*G06F 17/30* (2006.01)
(52) U.S. Cl. .......................... 707/797; 707/600
(58) Field of Classification Search .............. 705/7, 7.11
See application file for complete search history.

(56) References Cited

U.S. PATENT DOCUMENTS

| | | | |
|---|---|---|---|
| 5,953,707 A * | 9/1999 | Huang et al. ............... 705/7.25 |
| 6,496,744 B1 * | 12/2002 | Cook ............................. 700/95 |
| 6,609,129 B1 * | 8/2003 | Luh ............................... 707/797 |
| 6,757,689 B2 * | 6/2004 | Battas et al. .................... 1/1 |
| 7,558,793 B1 * | 7/2009 | Topolovac et al. ............. 1/1 |
| 7,698,323 B1 * | 4/2010 | Rangan et al. ............... 707/695 |
| 2002/0052807 A1 * | 5/2002 | Han et al. ..................... 705/27 |
| 2002/0069295 A1 * | 6/2002 | Edwards et al. ............. 709/246 |
| 2003/0009410 A1 * | 1/2003 | Ramankutty et al. ......... 705/37 |
| 2004/0002880 A1 * | 1/2004 | Jones ............................ 705/7 |
| 2004/0236621 A1 * | 11/2004 | Eder ............................ 705/10 |
| 2005/0222897 A1 * | 10/2005 | Walter et al. ................ 705/10 |
| 2005/0251505 A1 * | 11/2005 | McCauley et al. ........... 707/2 |
| 2006/0015381 A1 * | 1/2006 | Flinn et al. ................... 705/7 |
| 2006/0041840 A1 * | 2/2006 | Blair et al. .................. 715/513 |
| 2006/0136276 A1 * | 6/2006 | Schmitt ......................... 705/7 |
| 2006/0174190 A1 * | 8/2006 | Gomes et al. ............... 715/511 |
| 2006/0178928 A1 * | 8/2006 | Carney et al. ............... 705/10 |
| 2007/0021992 A1 * | 1/2007 | Konakalla ..................... 705/7 |
| 2007/0192149 A1 * | 8/2007 | Helander et al. .............. 705/7 |

FOREIGN PATENT DOCUMENTS

JP EP 1 248 191 A2 * 3/2002

* cited by examiner

*Primary Examiner* — Wilson Lee
*Assistant Examiner* — Jessica N Le
(74) *Attorney, Agent, or Firm* — Kilpatrick Townsend & Stockton LLP

(57) ABSTRACT

The invention is directed to an integrated computerized product lifecycle manager and requirements manager system for associating high-level requirements data with everyday product lifecycle management activities. The system includes a networked database comprised of one or more central computerized data servers, and a plurality of user computers (terminals, workstations) connected to the central server or servers by a computer data network. The server or servers will usually run multiple software modules such as database modules, various product lifecycle management modules, data viewer and decoder modules, and requirements management modules all operating in an integrated manner so that selected portions of the requirements tree, from the top high-level requirements to more detailed low level requirements, can be presented to users in a context relevant manner. The invention additionally includes context management module by which selected portions of the requirements data may be exposed or redacted according to organizational needs.

18 Claims, 6 Drawing Sheets

PRODUCT NETWORK MANAGEMENT SYSTEM AND METHOD

BACKGROUND OF THE INVENTION

This invention is in the technical field of enterprise data management systems, and, in particular, product design management systems and methods.

Most organizations, and particularly businesses and business entities, need to coordinate a wide variety of different information and information types during the course of their daily activities. As an example, consider an organization that manufactures electronic products. The organization must coordinate the concept, design, development, prototyping, pilot production, scale-up and launch of it's various new products. Manufacturing must produce the products at high volume, and insure that the products meet quality standards. Service and support departments must monitor the product performance in the field, and help support customers. As more and more environmental regulations come into effect, even disposal of products now becomes highly complex, as various types of "green" regulations that differ from country to country.

Other company functions must be integrated into this overall product management framework. Sales, marketing and customer support must manage relationships with customers, accountants must manage the financial record, supply chain managers must manage orders and relationships with suppliers, and the company's personnel department must manage employees, and insure that staffing levels and employee needs are met in a way that allows the organization to meet its overall objectives.

In order to handle this type of complexity, companies such as Agile Software Corporation, and other vendors, have introduced sophisticated computer systems that can collect data from these various departments and present the data in a way that lets the organization run its operations electronically. These systems, often called "Product Lifecycle Management" (PLM) systems, function by using data translation or decoding "middleware" that extracts data from each department's specialized software programs (e.g. the design department's various CAD system's, the accounting department's financial software, various specialized databases and so on. The PLM system takes this multi-source data, collates it into a comprehensive database, and presents it to the organization in a form that allows authorized individuals full access to the data that they need to do their respective tasks, regardless of where the data originally came from. Thus a design engineer can get full access to accounting cost data for a particular product subcomponent, can see what the manufacturing yields are for that product, can track customer complaints, and so on. Such PLM systems, such as the Agile 9 system produced by Agile Software Corporation, San Jose, Calif. greatly increase organizational effectiveness, and are presently on a rapid adoption curve worldwide. Examples of prior PLM art include U.S. Pat. Nos. 7,124,150 and 7,010,580.

Although organizations and products are often extremely complex, even the most complex organizations, businesses, and products often rest on some very simple fundamental principles (i.e. "meta ideas", "fundamental requirements", or "intent"). Often revolutionary new products and business opportunities are, at the heart, so simple that they can be written on the back of a napkin. Automobile companies were started on the "back of a napkin" idea of rep lacing a horse by meshing an engine with a carriage. As the concepts are developed further, this fundamental concept/requirement/intent (carriage with an engine and no horse) is modified with additional requirements, which usually change with time.

As an example, Henry Ford added additional requirements to the root (initial, base, or trunk) "horseless carriage" concept. He added additional (secondary, side, branch) concepts that the automobile should also be inexpensive (allowing it to be mass produced on a large scale) and reliable. In Ford's mind, these were the main secondary criteria, as exemplified by his famous statement: "any color, so long as it is black."

As time when on, however other automobile companies, such as General Motors, realized that appealing to the customer's sense of style was also important, because this would give the automobile company a competitive advantage. As a result, other companies modified Ford's "low cost" requirement to incorporate an additional high level requirement that the auto should also be visually attractive (colors other than black).

As time went on, still more high-level requirements were added to the automobile requirements "tree". Some of these later requirements include safety, and environmental friendliness. Note that requirements lists are often referred to as requirements "trees", because many requirements depend upon and branch out from a few fundamental requirements, and the diagrams of these lists often resemble trees. A complex device such as an automobile has a huge requirements tree that extends many levels downward.

Ideally every activity that an organization performs should be consistent with the organization's high-level requirements "tree". If the organization is attempting to design a sports car, ideally the design engineers should not select a heavy diesel engine. If the organization is attempting to build a reliable car, the accountants and the supply chain managers should not necessarily choose the cheapest component if it has a high failure rate.

Unfortunately, as product and organizational complexity grows, it becomes very easy for both workers and management to lose track of the big picture, and instead focus on optimizing their individual areas at the expense of the big picture. Design and manufacturing engineers may try to simplify the automobile design process by putting the gas tank where it is easiest to assemble, rather than where it is safest. Accountants and supply chain managers may optimize costs by choosing the cheapest vendor, and forget about reliability, and so on.

Complex products often have many requirements, many of which may not be fully understood when the product is first conceived, and which may later turn out to impact each other in unexpected ways. Because of complex dependency issues, design changes to one area may often end up having an unexpected impact on the design specification for a very different area. Thus, particularly when complex products are being designed by large teams, the design process is often a series of negotiations, sometimes tense negotiations, between different team members, as all strive to come up with a set of design specifications that both meets customer demands, and is actually feasible.

In order to facilitate the design of complex products and systems, requirements management software systems have been developed to automate the task of defining the various requirement levels in a complex project, and managing the various requirement changes and conflicts that occur during the course of product development. Such products, exemplified by the Telelogic DOORS® requirements management system, Telelogic corporation, Malmö Sweden, are becoming popular for analyzing requirements for complex systems.

Examples of prior requirements manager art include U.S. patent applications 2004/0073888, and 2005/0149917.

Unfortunately, even with modern PLM systems to manage complex enterprises, the problems of ensuring that individual workers are aware of how their decisions impact a product or an organization from the "big picture" standpoint still persists.

Present day PLM systems allow a design engineer and an accountant to quickly collaborate in order to pick the cheapest part for a component, but they don't necessarily insure that this process is any wiser. Rather, present PLM systems just make the selection process much faster. What is needed is some way to convey "wisdom", that is a way to rapidly and almost automatically let individual workers understand how their particular activities and decisions impact the project as a whole.

Similarly, although requirements management (RM) systems have been devised that allow design engineers and managers to rapidly collaborate and sort out design priorities for a project, these prior art RM systems primarily confine their domain expertise to the design process. Earlier requirement management art is largely silent on how to automatically use requirements data to help manage the complex day-to-day organizational activities, which comprises "PLM space".

Thus, there exists a need in the art for a system and method that better addresses PLM management needs for automatically using requirements data for collaboration. As will be seen, the invention accomplishes this in an elegant manner.

DETAILED DESCRIPTION OF THE INVENTION

Figure 1:
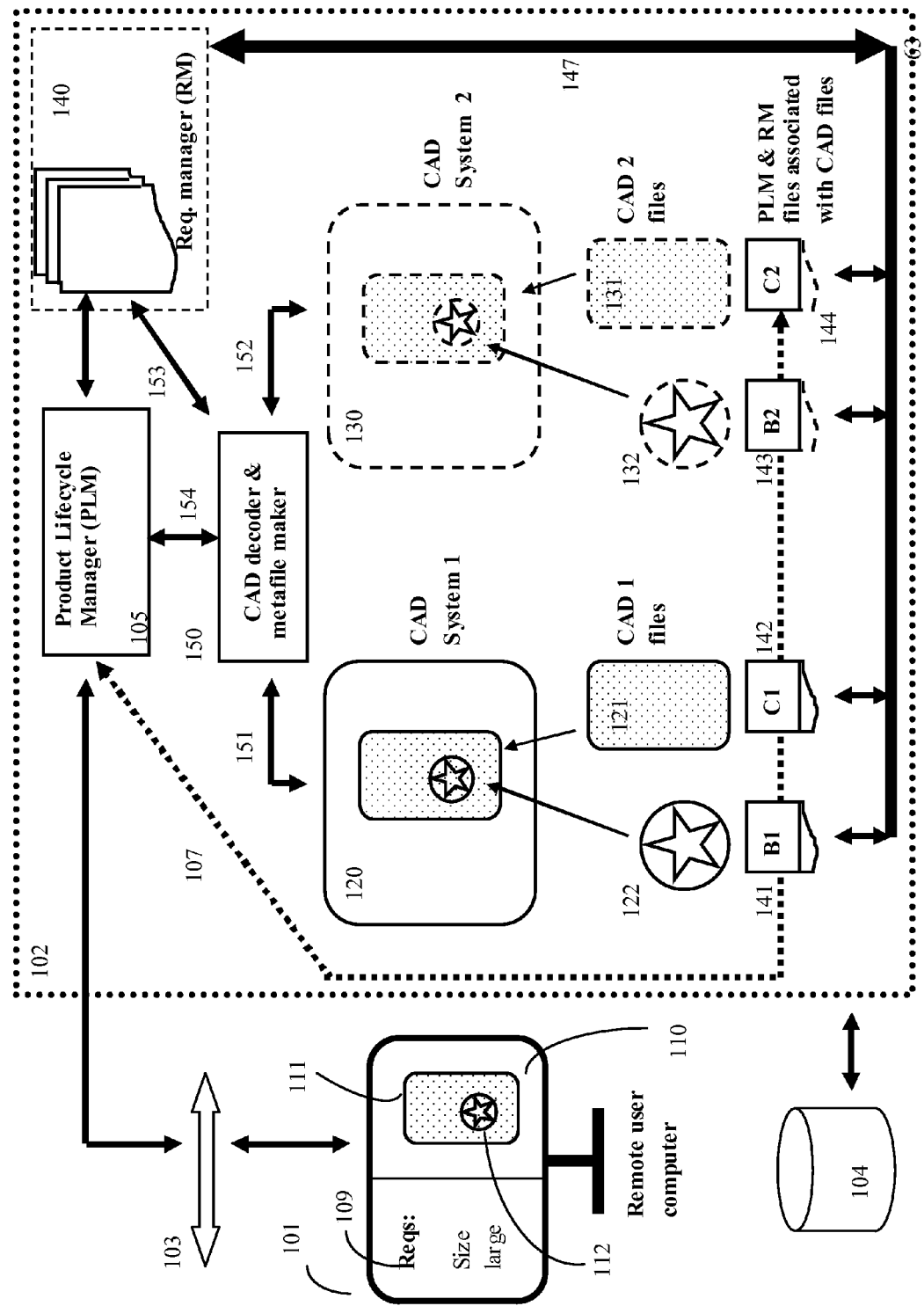
FIG. 1 is an overview of the PNM system according to the invention, showing the connections between the PNM's product lifecycle manager, CAD file decoder modules, requirements modules.

The invention is directed to a unique type integrated enterprise management system, herein termed a Product Network Manager (PNM); that is composed of an integrated product lifecycle manager (PLM), a universal document viewer able to decode a wide variety of file formats to display content to users, and a requirements management (RM) system. This system allows any authorized user to integrate the important enterprise "how" or "content" data (e.g. "what" information—parts drawings, specifications, costs, complaints, vendor data, customer data, etc. that is usually best understood in the overall "context" of the enterprises' particular products or functions) with the equally important, but up until now largely unaddressed or unintegrated, "why" or "intent" data.

Here, "why" or "intent" is used as a shorthand way of referring to the chain of logic (requirements tree) leading from the highest level (and usually universally accepted) postulates of an organization (such as "we build automobiles") down to the less clear and less universally accepted premises that underlay the thousands of decisions that the organization's employees must perform on a daily basis.

As an example, an individual employee working in an automobile company may be quite certain that the fundamental premise (highest level requirement or intent) governing his work is correct enough to be considered to be a postulate. However this employee may be far less certain about the soundness or intent of the "why" or "intent" reasoning behind some of his more specific tasks, such as the reasoning behind why he has been told to specify a particular color or design for a specific automobile part. Thus although this employee can query a PLM system and find out all about the part specifications, costs, vendors, and quality information, the PLM will be silent as to "why" the part was specified a certain way. That is, the PLM system will not give the employee insight into the chain of reasoning behind the specific part specification. As a result, the insight needed to help the employee cope with unexpected changes or problems is not readily available when and where the employee needs it.

If this "why" or "intent" (i.e. a traceable requirements tree) can be instantly displayed to authorized individuals, and/or readily edited and modified to adapt to new information, employees and managers are much more likely to make "wise" decisions that are more consistent with the highest level organizational premises (or requirements).

The invention satisfies this longstanding need by providing a networked database comprised of one or more central computerized data servers, and a plurality of user computers (terminals, workstations) connected to the central server or servers by a computer data network. In many cases, this network may be the Internet, and the user computers may be running Internet browsers. The server or servers will usually run multiple software modules such as database modules, various PLM modules, data viewer and decoder modules, and requirements management (PM) modules all operating in an integrated manner so that selected portions of the requirements tree, from the top high-level user requirements to more detailed low level requirements, can be presented to users (and optionally edited), within the context of their every-day product lifecycle management and document management activities.

The system is designed to make extensive use of existing infrastructure, including use of standard Internet network technology, equipment, protocols, and software, and it also takes advantage of many commonly used software applications and data types. The overall goal is to create a new type of product network system—an interconnected group of people, processes, and tools who's combined focus is to maximize the intelligent use of requirements information in order to conceive, develop, deliver, sell and service products to meet, or exceed, the customer's needs.

Generally, automated product lifecycle management (PLM) software systems are network data managers that allow users to exchange and view various types of business product information. This data can include product information such as design and development information, prototype and pilot production information, launch and ramp-up information, manufacturing production information, service and support information, and phase out and disposal information such as compliance with various governmental (green) waste disposal and recycling information.

In addition to this specific product data, PLM systems can also handle ancillary corporate and business functions, such as customer relationship data (CRM), enterprise resource financial planning data (ERP), Supply chain management (SCM) to manage the companies various suppliers, and human capital management (HCM) systems to manage the work and insurance records for the companies various employees.

Some of the specific data types handled by PLM systems include: product data, supply chain data, component part data, subcontracting company data, partnership data, design data, development data, access privilege data, trade secret data, confidential information data, business relationship data, business documents data, business agreements data, OEM products and components data, CEM products and components data, bill of material data, change order data, component part object data, component part linking data, component part identification data, component part number data, part attribute data, part affiliation data, part product context data, specifications drawing data, color data, size data, type data, price data, quantity data, find number data, cross-reference data, related information data, earlier version data, history of change data, text document data, graphics drawing data, other attribute data, redacted data, discovery privilege data, cost data, component parts specifications data, product specifications data, quantity received data, quantity needed data, availability data, supplier type data, geographical information, and purchase order data.

According to the invention, PLM systems often can be configured as various modules. Some of these modules include: product governance and compliance, product portfolio management, product collaboration, engineering collaboration, product cost management, product quality management, and other modules.

Product governance and compliance: This helps cross-correlate product and corporate function data with standards and government regulations. This can include things such as environmental regulation standards (e.g. the Waste of Electronic and Electrical Equipment [WEEE] directive, the Restrictions of Hazardous Substance [RHOS] regulations), software validation tracking, and industry specialized government regulations such as FDA Quality System Regulations (21 CFR Part 820) regulations for medical device manufacturers.

Product portfolio management: This facilitates product development by coordinating program information, and product information.

Product collaboration: This allows different organizations, such as original equipment manufacturers and their various subcontractors, to share product information throughout the world while at the same time keeping track of the status of the business relationships between the various organizations, and only sharing data in accordance with established business rules. Thus for example, different members of a product supply chain will have access to relevant information such as bills of material, product attributes, product configurations, product specifications, product documents, subcontractors involved, revisions and work instructions selectively, and as dictated by the level of the business relationship. For example, two competing subcontractors for a component may both be able to access the specifications part of the database, yet be locked out of the part of the database that gives access to the other competitor's bidding and performance history.

Engineering collaboration: Engineers use a variety of different computer aided design (CAD) systems, each highly specialized and very appropriate to their individual tasks, yet very expensive to operate on a per-seat basis, and often quite incompatible with other CAD systems. PLM engineering collaboration modules allow engineers to integrate data from a variety of different mechanical design CAD (MCAD), electronics design CAD (ECAD), software and desktop publishing applications, located across the world, and instantly allow a user to access the right set of design data from a PLM server, often through a network (such as the Internet) using inexpensive user terminals such as Internet web browsers.

Product cost management: Business managers, accountants, production managers, and designers all need to understand various product costs in detail, and manage supply and delivery contracts effectively. This module usually contains cost, delivery, and contract data relevant to these efforts.

Product quality management: These PLM modules allow the company to insure customer satisfaction and conformance to government regulations by implementing a corrective action product quality monitoring system. Corrective action systems track customer complaints and sub-optimal product performance incidents, assign responsibility to various individuals to investigate the root cause behind each problem, and attempt to solve or mitigate the problem by initiating some sort of change to the product creation and management process that will hopefully solve the problem, or at least mitigate the severity of the problem.

Any organization that attempted to write completely new software that could handle this entire multitude of functions competently would face a task so complex as to be effectively impossible. Rather than attempting to do this impossible feat of writing a comprehensive system composed entirely of new software, modern PLM software instead works largely as "middleware". The PLM software uses many data decoder and data transfer programs which translate (decode) and transfer data between preexisting data origination ("authoring") programs (such as CAD systems, accounting programs, specialized product databases, and the like) and transfer this data to preexisting database management software, such as Oracle or SQL databases and the like. The PLM software coordinates all of these independent and pre-existing programs into a cohesive whole, and makes it easy for users to access these pre-existing programs through a single, network based, user interface (PLM interface).

Using the PLM interface, multiple users on a network can submit various queries and various types of data to the PLM. The PLM in turn consults its database to find out where the appropriate data is stored, processes the data, and presents the results of its processing to the user. Often the PLM will in turn translate the data back into a format that can be handled by the various authoring programs of origination. Thus a design engineer can submit a product design query to a PLM, the PLM, after consulting its database, will pull out the appropriate CAD files, and send this data to a version of the authoring CAD program that exists on the PLM server, rather than the user desktop. The CAD authoring program will itself interpret the CAD data file, and output a view of the drawing. The PLM program translates or decodes the CAD authoring program output into a format suitable for transmitting over a network, and capable of being displayed on a low-cost user computer (terminal) that does not, itself, have a copy of the CAD authoring program.

Using this technique, a single low-cost user terminal can gain access (through a network connection to a PLM server, which is usually in a different location) to essentially any set of data available to the enterprise, and manipulate this data, using only a very simple terminal that may consist of little more than a web browser and a network or internet connection. In addition to CAD files, many other types of files, such as authoring tools, spreadsheet tools, project management tools and other specialized software can be "run" on low-cost remote terminals on an as-needed basis. As per the CAD example, the main block of this specialized program code resides on the PLM server. The PLM takes remote user terminal queries, runs it on the instance of the authoring program running on the server, and then sends an image of the output to the remote viewer. Alternatively, the PLM can run an integrated universal viewer that can natively decode all CAD formats without the necessity of running the authoring program on the server. In either case, assuming a reasonably high bandwidth network and low to moderate latency, the final result from the standpoint of the remote user is that the particular authoring program needed to manipulate the requested data app ears to be residing on the remote user's local computer.

In order to manage all of this data manipulation, translation, and decoding, PLM systems employ a variety of different software integration techniques, including Extensible Markup Language (XML) and Java Message Service (JMS) as general purpose data decoder and exchange tools; Product Data eXchange (PDX) for electronics bills of materials, approved manufacturer lists, engineering change orders, and material content information (useful for WEEE compliance); RosettaNet for more general internet-based business data exchange standards; SOAP (Simple Object Access Protocol) for exchanging XML data using HTTP protocols that are compatible with a wide variety of web browser and network firewall environments; and Web Services Description Language (WSDL) language techniques that also enable various types of data protocols to exchange data between different types of programs using web protocols that generally cross firewalls without difficulty.

PLM software often also incorporates various analytical modules that can automatically generate reports and statistical summaries by pulling together data according to user specified frameworks.

From a business perspective, PLM systems serve as a delivery vehicle that allows an organization to easily access and manage the enormous variety of different data types necessary to operate a modern enterprise. Prior to the advent of PLM, such information was stored in a multitude of incompatible formats, often paper based, in a multitude of individual department "fiefdoms". Data transmission across departmental and format boundaries was slow, prone to distortion, and sometimes even politically hazardous.

PLM systems help companies bring in revenue quicker, reduce costs, improve quality, ensure compliance with government regulations, and help facilitate innovation by instantly putting the right set of data in front of the right user at the right time.

Complex enterprises use the services of many different disciplines, each of which in turn has many different subspecialties. As previously discussed, many of these subspecialties have turned to specialized software authoring tools to document their work and enhance their productivity. These specialized software tools (here called "authoring programs") have evolved to become "best in class" for their respective applications, and in turn the workers in each subspecialty have become highly proficient in manipulating the user interfaces for their respective authoring program applications. As a result, the chances that all workers will standardize on new and standardized "does it all" software applications are probably somewhat less than the chances that all nations of the world will drop their respective languages in favor of Esperanto. Just as we accept the fact that we live in a multi-lingual world and deal with this via translators, so software systems that manage complex enterprises need to use software decoders to somehow access data stored across many incompatible authoring software packages, and allow the this data to be easily exchanged with any enterprise worker, in any location, that needs this data. The invention provides a new useful system and method of improving the process.

According to the invention, for the purposes of PLM and PNM applications, the decoding software such as the Cimmetry AutoVue™ client-server system is particularly useful. This system allows PLM users to view and annotate documents using a standard web browser interface. The system manages a variety of different program formats, including 2 and 3D computer assisted design (CAD) formats such as AutoCAD, CATIA, CADKEY, HPGL, Inventor, ME10, MicroStation, Pro/E, Solid Edge, SolidWorks, STEP, Unigraphics, VISIO, VRML; electronic design automation (EDA) formats such as Cadence, GDS II, GERBER, Mentor, PADS, PCAD, and Zuken; common image and office documents such as PDF, TIFF, Excel, PowerPoint, Word, WordPerfect; and many other formats.

The Cimmetry AutoVue system may be utilized according to the invention to allow a remote user to access the full functionality of either MCAD (Mechanical CAD) or ECAD (Electronic CAD) applications by using the remote user's Java-capable web browser as the access device. Here, the functionality of the remote user's web browser is enhanced by suitable user interface and data collection Java applets that are sent by the server. These Java applets then run on the user's web browser and collect data (mouse clicks, text data, etc.) for the AutoVue universal document (e.g. CAD program, design program, database program, etc.) viewer module associated with the particular data that the remote user has requested to view and/or modify. The Java applets send the user input data to the server, which passes this data to the AutoVue universal document viewer. The AutoVue universal document viewer module for the particular software application (here a CAD program will be used as an example throughout this discussion) then processes the data file and the user input data from the Java applet.

For example, if the remote user wishes to examine a drawing for an automobile part that is stored in an AutoCAD file, the server will pull up the file and start up an instance of the AutoVue universal document viewer running a decoder module that can read the requested file. The AutoVue universal document viewer running on the server will generate an image of the part. The AutoVue software running on the server takes the visual output data generated from the AutoCAD file and renders (decodes) it into a common metafile format ("server based metafile rendering") that can be transmitted over the network to the remote user, and then displayed on the remote user's web browser. The remote user thus "sees" the contents of the part file, even though the actual AutoCAD decoder module of the AutoVue universal document viewer is running on a server at a different location.

If the remote user wishes to manipulate a part that is being shown on his computer, the user would interact with the image as if a CAD system was running on his own system. The Java applets running on the local user's web browser translate the user interface commands (for example, a mouse click and movement requesting that the AutoCAD decoder module of the universal document viewer zoom in (magnify) a particular part of the drawing). If there is enough information on the user's own computer to execute this command without further data from the remote server, then the Java applets running on the web browser in the user's computer can execute the command (for example a command to magnify the image) immediately, resulting in a relatively smooth and responsive user interface that minimizes network transmission latency issues.

The metafile can also be stored on the server for use beyond the first session by the same or other users, or in an alternative embodiment, on the user's system. This way, frequently viewed files are immediately accessible. These files may also be pre-rendered on the server ahead of actual use to further enhance system responsiveness. The metafiles may optionally be incorporated into user database systems (such as PLM systems, etc.) as needed.

If additional data is needed, (for example, the user wants to move a significant amount to the left, exposing detail that the server's AutoCAD decoder module had not previously generated and which had not been previously sent to the remote user, then the Java applets running on the web browser in the user's computer can send the request for additional data back through the network, to the server. The AutoVue software translates this request back to the AutoCAD decoder module of the AutoVue universal document viewer. In this example, the AutoVue's AutoCAD decoder module software would receive the request to move the displayed image over to the left by a large amount, and would generate new image data. The AutoVue software would translate and send the image of the repositioned part, containing the new data, back to the remote user as a new or updated metafile.

This type of system greatly enhances the ability of workers to collaborate. Different workers, in different parts of the world, can view and manipulate the same documents at the same time if they so desire. They can also annotate or mark up the documents, and write and talk with each other. The net effect is that miscommunication is reduced, and the speed at which correct decisions are reached is greatly enhanced. Because there is no need for translation (i.e. the original file remains intact), all users view the same file directly out of the vault with no duplication of data and always in sync with latest version An additional advantage of the Internet web browser approach is that it allows data to be transmitted using the ubiquitous HTTP format. For security reasons, many enterprise firewalls are often configured to block transmission of many of the non-HTTP format data packets. However the firewall must allow HTTP data packets through because these are required to access standard web sites. As a result, this type of system can employ a technique called "HTTP tunneling" to allow users to exchange and use data from almost any program, even when operating behind a relatively restrictive firewall.

Typically such data decoders and viewers also contain license manager software in order to ensure that the manufacturers of the many specialized authoring software applications receive proper compensation for their particular programs. Thus, for example, a large company might negotiate a license arrangement with a CAD program vendor stipulating that no more than 5 (for example) users would access the particular CAD authoring program at any given time. If the company later found that this number was inappropriate, the license agreement could then be modified, license payments adjusted, and then number of users allowed to simultaneously use the CAD system at any onetime would be adjusted accordingly.

In certain cases, corporate users may not wish to use a standard Internet browser as the user interface, but would rather use a proprietary user interface, such as a specialized PLM interface, which may or may not look like a web browser interface. In such situations, the Java applets may be modified or rewritten so as to send data to and from a customized user interface. For example, users may wish to present data within the context of an existing PLM user interface or knowledge management interface, in which case such customized Java applets may be more appropriate.

Although such server data decoding, viewing and markup systems greatly enhance collaboration, the systems provide only part of the solution. They enable data to be easily viewed from essentially any location using networked Java-capable Internet browsers, but don't integrate this data with other enterprise issues. For example, they don't cross-correlate a drawing of a part, with a customer complaint database, or apart cost and vendor availability database. To solve this problem, the data decoding and viewer must be meshed with the PLM systems (previously described).

Unlike prior art PLM systems, which evolved to assist in a company's daily management problems (e.g. coordinating design, manufacturing, accounting, customer support, sales and marketing, human resources, etc.), prior art requirements management (RM) software systems evolved in response to a different set of problems: coordinating and reconciling specifications for complex products. As a result, although both make heavy use of computer database and network technology, the two types of software differ in their overall design and function. The invention improves on such systems.

According to the invention, RM software systems employed by systems configured according to the invention are configured to allow product requirements to be developed as a series of specification layers, the top layer representing the highest (most general) specifications, the next layer being representing more specific (but still rather general) requirements that are consistent with the top layer requirement, but which add more supporting detail. The next layer down from this provides still more requirements and detail. Each of these third level requirements must be consistent with the second level requirements that they are dependent upon, and also (by inheritance from the second level) thus consistent with the first-level requirement. As previously discussed, the overall requirements structure resembles a tree, with the trunk being the first level requirements, the main branches being second level requirements, third level requirements being still smaller branches off of the main branches, and so on to many levels.

As described herein, RM systems typically include standard computer components, (e.g. computing systems and methods such as one or more microprocessors, mass storage memory such as hard drives, high-speed internal memory, database software, data input devices and methods, data display systems and methods, network interface systems and methods, remote user terminals or computers connected to the network, etc.).

RM software is designed so that nth level specification layers must be associated with the (n-1)th level layers, and the system will allow users to easily compare the nth level layer to the (n-1) level layer, the (n-2) level layer, and so on, and determine if the nth level layer requirements are consistent with that particular requirements chain. Thus the RM software functions to flow the top level requirements on down the tree (or linked list) to the very lowest level requirements.

As an example, the top three layers in the requirements tree for an early "model-T" automobile might look like:

---

Layer 1: 1 Make a horseless carriage that uses an engine (automobile)
Layer 2: 2.1: The automobile should be low cost (for mass production)
    2.2: The automobile should be reliable in all weather conditions
    2.3: The automobile should carry six people -continued Layer 3: 2.1.1: To reduce costs, all automobiles will be painted black
2.1.2: To reduce costs, an assembly line will be used
2.2.1: For reliability, a long-life, low rpm, engine will be used
2.2.2: For reliability, a steel suspension will be used.
2.3.1: The automobile should have seats for six Consider the case of a model-T paint-engineer, who through some strange quirk of time has acquired access to a modern computer connected through an Internet portal to a server running an RM configured with model-T requirements. He is working to further refine the paint specifications 2.1.1 by adding a forth level to the RM tree.

According to the invention, the RM software is configured to immediately show the engineer the parts of the requirement tree that are most relevant to the problem at hand, and also allow for unexpected linkages between different requirements to be added as these unexpected linkages are detected. Initially, the RM might flow the top-level requirements down to the paint engineer, using the initial dependency tree as follows:
1: Make a horseless carriage that uses an engine (automobile)
2.1: The automobile should be low cost (for mass production)
2.1.1: To reduce costs, all automobiles will be painted black.

The paint-engineer, being motivated achieve the lowest possible cost, might initially specify the paint as follows:
2.1.1.1: The paint shall be interior black latex paint (cheapest paint available).

However upon review, higher management might notice that interior paint is incompatible with the 2.2 requirements that the automobile should be reliable. This is because it rains on automobiles, and interior latex paint is not reliable in the rain. Thus, based upon this insight, a new dependency linkage between formerly unconnected branches of the tree might be added. That is, requirement 2.2 (that the automobile should be reliable), would have its' dependency linkages modified so that this requirement flows though to the paint specifications subsection 2.1.1.

Here the novel RM software becomes very valuable, because it allows such unexpected linkages and dependencies to be easily added, and the results of this insight become immediately available to designers working in the relevant areas.

In this case, when the manager adds this new link to the RM, making 2.1.1 also dependent upon 2.2, the RM now presents the paint engineer with a revised specifications list:
1: Make a horseless carriage that uses an engine (automobile)
2.1: The automobile should be low cost (for mass production)
2.2: The automobile should be reliable in all weather conditions
2.1.1: To reduce costs, all automobiles will be painted black.

The RM continues to shield the engineer from specifications that presently app ear to be unnecessary to the job at hand (i.e. 2.3 and 2.1.2 through 2.3.2), by "redacting" (not displaying) data from branches of the requirements tree that are not relevant to the problem at hand.

Using the RM, the revised "tree" now supplies the paint engineer with relevant supplemental information that allows him to specify a type of paint that is compatible with the overall product requirements. This would be:
2.1.1.1: The paint should be long-life exterior-grade black paint.

Later, when the car is in prototype high volume manufacturing, a manufacturing engineer might encounter problems because the paint, although black and durable, dries too slowly to be compatible with an assembly line. This manufacturing engineer can then insert yet another unforeseen linkage into the system by also creating a dependency link between the third level requirement: 2.1.2 (To reduce costs, an assembly line will be used) and the new fourth level requirement: 2.1.1.1 (The paint should be long-life exterior-grade black paint). When this linkage is inserted, RM would present the paint requirements tree as:
1: Make a horseless carriage that uses an engine (automobile)
2.1: The automobile should be low cost (for mass production)
2.2: The automobile should be reliable in all weather conditions
2.1.1: To reduce costs, all automobiles will be painted black.
2.1.2: To reduce costs, an assembly line will be used
2.1.1.1: The paint should be long-life exterior-grade black paint.

The paint-engineer can then go into the RM, and specify a particular type of paint as a fifth level specification:
1: Make a horseless carriage that uses an engine (automobile)
2.1: The automobile should be low cost (for mass production)
2.2: The automobile should be reliable in all weather conditions
2.1.1: To reduce costs, all automobiles will be painted black.
2.1.2: To reduce costs, an assembly line will be used
2.1.1.1: The paint should be long-life exterior-grade black paint.
2.1.1.1.1: Paint should be quick drying for assembly line.

Later on, in response to competitive pressure from General Motors, which has started to produce automobiles in all colors, an executive may come in make some more substantial changes to the RM requirements tree (e.g. adding a new high level specification that customers have a color selection, and deleting the requirement that the paint must be black): This revised tree may read:

Layer 1: 1 Make a horseless carriage that uses an engine (automobile)
Layer 2: 2.1: The automobile should be low cost (for mass production)
2.2: The automobile should be reliable in all weather conditions
2.3: The automobile should carry six people
2.4: NEW-Customers can choose among three popular colors
Layer 3: 2.1.2: To reduce costs, an assembly line will be used
2.2.1: For reliability, a long-life, low rpm, engine will be used
2.2.2: For reliability, a steel suspension will be used.
2.3.1: The automobile should have seats for six In order to avoid orphaning all the branches of the tree that depend upon the now deleted requirement 2.1.1, the RM software will ideally inform the executive of the problem, and the executive can solve the problem by linking the branches of the tree that depend upon 2.1.1 (all automobiles will be painted black) to the new specification 2.4 (customers can choose among three popular colors), and optionally renumber the specification numbers (or not) depending up on organizational preference.

When this is done, RM software now automatically presents the paint engineer with the revised specification list:
1: Make a horseless carriage that uses an engine (automobile)
2.1: The automobile should be low cost
2.2: The automobile should be reliable in all weather conditions
2.4: NEW Customers can choose among three popular colors
2.1.2: To reduce costs, an assembly line will be used
2.4.1.1: (formerly 2.1.1.1): The paint should be long-life exterior-grade black paint.
2.4.1.1.1: (formerly 2.1.1.1.1): Paint should be quick drying for assembly line.

On of the real strengths of RM software is that it instantly propagates the effects of this high-level executive decision down to the levels of the organization that need to implement the change, by passing middle management delays, and preventing confusion.

The paint-engineer, up on seeing the revised requirements on the RM display, would hopefully immediately see that the "black" specification in 2.4.1.1 needs to be modified to:

2.4.1.1 (revised): The paint should be long-life, exterior grade, red, green, or blue paint.

The PM software then automatically integrates both the high-level executive change, and the lower level paint-engineer change, into the following revised specification tree:

1: Make a horseless carriage that uses an engine (automobile)
2.1: The automobile should be low cost
2.2: The automobile should be reliable in all weather conditions
2.4: Customers can choose among three popular colors
2.1.2: To reduce costs, an assembly line will be used
2.4.1.1: The paint should be long-life exterior-grade red, green, or blue paint.
2.4.1.1.1: Paint should be quick drying for assembly line.

And all will be well until someone points out to the executive that the paint-engineer, who had previously been deemed quite competent when he was only working with black paint, is apparently color blind, and has made a hideous color selection.

Prior art RM systems were primarily developed for product and process specifications, and thus had a relatively narrow scope. Thus a prior art RM would be silent as to the employee requirements for a paint engineer. Likewise a prior art PLM will tend, at most, to incorporate requirements for an employee position without giving the reasoning behind the requirements, and more importantly not foreshadowing when a change in high-level requirements may ripple down into something as sensitive as employee qualifications for a position. Thus integrating a RM and a PLM creates some unique problems—that some requirements are too sensitive to be shared on an organization wide-basis, or between organizations. The invention overcomes these problems.

For example, in the case where a PM is merged with a PLM, it now becomes possible to establish new and unexpected cross connections between functional areas. In an integrated RM and PLM system, the engineer's dubious color selection might cause the executive to make changes in the personnel requirements list for the paint engineering position. The executive might want to add a new requirement: "paint engineers should not be color-blind."

However here, to spare the sensibility of the unfortunate paint engineer, the executive may wish to "hide" this new requirement from the engineering department while personnel quietly interviews new paint engineer candidates.

So to summarize, the RM software must not only present a tree-structured requirements list, it must also allow links between different levels to be edited (created, modified, or removed) as the project progresses, and ideally also incorporate proper authentication or security steps to be sure that lower levels of the organization don't make high-level changes without high level approval (and possibly the reverse, since it may not be wise to enable a CEO to change a resistor value without approval from the design engineer). The RM software database may optionally also maintain an audit trail of past design changes, and may also optionally contain automated software agents that scan up and down the various linked requirements lists (using keywords, context searches, or other methods) looking for potential requirements conflicts or problems to bring to the attention of the users.

According to the invention, the RM software essentially helps users understand how their particular part of the system fits into the overall product or project design intent by producing a linked list of requirements that flows down from the very top-level project requirements down to their particular level, and presenting this list for analysis.

Ideally, the RM software would also allow users to input information pertaining to how well their part of the project actually meets, or is likely to meet, requirements. For example, the RM software might allow the paint-engineer to avoid problems with upper management by allowing him to delete the "black" specification from specification 2.4.1.1, and entering a note saying that the cheapest colors that met the specifications were red, green, and blue, followed by a request for comments.

The RM software can then automatically process this lower level input, and might, for example, display the following comment back to the executive in forward or reverse ordered list in a way that allows the executive to understand how this high level change is affecting the rest of the organization, and how the organization proposes to implement this change. The RM software can either present this within the context of a requirements manager viewer, or alternatively send back the lower-level message in the form of an automated email, voice, mail, fax, cell phone text message, or other communications systems and methods to ensure that any lower-level concerns are relayed back up the requirements list in a prompt manner. For example, the RM could automatically send the following email message:

TO: 2.1.1 and 2.4 change originator
CC: designers responsible for 2.1; 2.2; and 2.1.2
RE deletion of 2.1.1 (To reduce costs, all automobiles will be painted black.) and addition of 2.4: Customers can choose among three popular colors
Other Areas Affected:
2.1: The automobile should be low cost
2.2: The automobile should be reliable in all weather conditions
2.1.2: To reduce costs, an assembly line will be used
From: 2.4.1.1: The paint should be long-fife exterior-grade black paint.
QUESTION from 2.4.1.1 owner: "The cheapest colors that meet the present RM specifications are red, green, and blue, is this OK?"

Alternatively, and according to another embodiment of the invention, the system might present other types of information. This could include statistical information showing how many times these requirements have been changed, collation of any numerical data (e.g. weight, power usage, volume, materials, etc.) associated with the data field of various specification groupings, and so on.

Ideally, the system will be a networked system, in which the main data manager database, computational systems and methods, and software resides on one or more networked servers, and multiple users can communicate with the RM server from various remote terminals located in various parts of the world—for example the users can communicate to the RM server via web browsers, and using the Internet.

Requirements management software includes Telelogic Doors, Integrated Chipware RTM Workshop, Rational Software Requisite Pro, Technology Builders Caliber RM, and the like.

Prior art requirements management systems typically were restricted to "high trust" environments where access was restricted to specific departments, high level employees, or both. By contrast, product lifecycle management systems and product network management systems are designed to operate with a much wider base of users, and as a result, the requirements management module of an integrated product network situations faces must be capable of running in "lower trust" environments.

As a result, the invention includes the concept that integrated RM and PLM systems will preferably manage the integration process via one or more "requirements context management" software modules. As will be disclosed in further detail, a requirements context management software module or modules determines which portions of the requirements tree to link to which product lifecycle management files following predetermined rules. It is these rules, which are based on levels of employee access, security, ability to designate some requirements as "secret" or "confidential", etc., that allow the context manager to automatically determine, on a per item basis, what portions of the full requirements tree (associated with that particular item) to expose or redact.

According to the invention, some of these "trust" issues that a requirements context manager would handle would include:

1. Although giving lower-level employees the ability to see the requirements one or two levels up from the item that they are working on will almost certainly help decision making, exposing levels that are much higher, or exposing side levels, could potentially be distracting. Thus the requirements context management rules may take into account employee rank, department, function and security level in determining how much of the full requirements tree to expose.
2. As previously discussed, upper management may wish to have the ability to carefully document certain requirements, yet keep some of them "hidden" or "secret" from most or certain employees or outside organizations. Examples include a hidden requirement for an "undocumented" product feature, such as an ability to run in a higher level of functionality upon receiving a software upgrade, which management may wish to keep secret for business reasons. In this situation, the requirement might be exposed to the organization's software developers, yet be "hidden" from the organization's field sales personnel. (Here the fear would be that the sales staff would stop selling while they awaited the upgrade, or alternatively get customers enthusiastic about an experimental upgrade that has not been proven or approved yet.)
3. Depending upon "trust" levels, some employees may be locked out of viewing a requirements tree altogether, others might be allowed to see only the next one or two levels up, but not be able to annotate the requirements with a comment-on or alter the requirements. Still others might be allowed to see steps above and/or steps below, and annotate the requirements with a comment but not officially change the requirements. Still other employees might be allowed various levels of requirement editing and approval privileges.
4. Different levels of management may have conflicting opinions as to how much of the requirements tree to reveal. In some situations, upper management may wish to set overall requirements context management rules (i.e. determine what the greatest extent of trust is), and also set the rules to enable or disable lower management from being able to adjust requirements trust and access privileges in their respective areas.
5. These same considerations also apply to vendors and customers. Just as employees will have certain levels of trust and access, so vendors and customers will also have levels of access. In some cases, it may be determined that they should not have access to requirements trees at all. In other cases, access may be asymmetric—that is a customer may demand full access to a vendor's requirement's tree, but only grant partial access to its own requirements tree, and so on.

A system and method configured according to the invention can address these trust issues in an elegant manner.

Other issues addressed by the invention concern the details of the link between a particular element being investigated by a user, and the requirements. Generally, it will be useful to view the branch of the requirements tree associated with the particular element being examined. For example, reliability engineer investigating the failure of an engine part is primarily going to be interested in the "engine" branch of the specifications tree, and will likely wish to block out the "upholstery" or "rear bumper" part of the specifications tree as being both unnecessary and distracting. Thus the software will require some sort of requirements tree context management module, which will manage what parts of the requirements tree are shown or redacted according to various predetermined rule.

As an example, one type of predetermined rule is the rule that only the branches of the requirements tree that directly supply requirements for the particular item being viewed should be displayed. Another type of predetermined rule is the rule that, in order to avoid swamping users with unwanted detail, or to preserve confidentiality, only the first two or three levels of requirements directly above the item being viewed should be shown.

In other cases, the predetermined rules need to show more than just the most immediate requirement that impacts the part, or just one branch of the requirements tree. Consider a different engineer who is working on an air conditioner problem. Automobile air conditioner design is essentially an engineering compromise. The air conditioner can't take too much engine power, and may even have to automatically turn off when the engine is overtaxed, so the engine part of the requirements tree is involved. The air conditioner can't be too loud, or it will negatively impact the sound system, so the sound system part of the requirements tree is involved. The air conditioner also takes up a certain amount space in the dashboard, so the dashboard specifications tree is involved as well. Thus in this example, the air conditioner part has at least a dotted line linkage to three separate requirements trees. (Here, for purposes of this discussion, it is assumed that the linkage between the parts and the requirements trees has been done accurately.)

In this case, to cope with this complexity, the predetermined rules for the requirements tree context manager for this part of the tree will ideally be set to display multiple branches from the requirements tree.

As previously discussed, CAD decoders and other file decoders often find that, particularly when dealing with a complex design that must be transmitted to a remote user over a limited bandwidth network, it is better (faster) to use a pre-generated metafile. To enhance the ability of the system to instantly respond to commands from the remote user, it is also often advantageous to cache a copy of this metafile on the server. In some cases, this metafile may be cached on the user's computer as well. In this way, the remote user can instantly inspect the CAD file from various angles, zoom in to areas of interest, etc., and the user's local computer can rapidly fill these requests by using data from the metafile cache.

Just as remote users will wish to instantly rotate or zoom in on areas of interest in a CAD file, and will wish the system to respond as quickly as possible, so remote users will wish to have the ability to turn on the requirements tree link for the CAD file, and get this requirements tree information as quickly as possible. In order to provide this feature (e.g. the ability to move a mouse over a CAD drawing area of interest, and immediately see relevant portions of the requirements tree in a pop-up window or other format), the copy of the metafile, stored in the local system cache will preferably contain index pointers (tags, addresses, labels) that link objects portrayed in the metafile to the relevant portions of the requirements tree.

The decoding program can generate these index pointers at the time the metafile is created. Although there are a number of ways to do this, one convenient way is to design the decoder software to embed index links into the metafile that link the various metafile objects to locations on the requirements tree, creating a requirements indexed metafile.

For example, consider a simple automobile part, such as a music player component (module) that might be bundled into a hypothetical built-in automobile infant seat. This music player module might be drawn in two different and incompatible CAD systems. Irrespective of CAD format, the decoder software will generate a metafile that will continue to index or link the various elements in the CAD drawings to the predefined locations on the requirements tree. Thus, irrespective of the original CAD drawing format, assuming that the modular structure of the two CAD drawings was otherwise similar, a remote user would be able to "click on" (select) relevant portions of the CAD drawing that is stored in the metafile in the remote user's computer, and instantly (from a user perspective) be shown the portions of the requirements tree that are relevant to the selected part. Here the remote users computer will follow the index from the CAD metafile to the requirements tree (either stored on the remote computer, or back in the main server). Alternatively the connection between the graphics and the requirements may be done through the PLM.

Ideally, a "requirements aware" metafile will also contain requirements context management data as well. This is because remote users will not wish to be shown irrelevant portions of the requirements tree, management will not wish to disclose sensitive requirements data to unauthorized users. In one embodiment, this requirements context data is linked to the index pointers in the metafile that link metafile objects to specific locations in the requirements tree.

Often, bandwidth requirements may make it burdensome to repeatedly send the full requirements tree to the remote user. Often too, security concerns will dictate that the full requirements tree should not be sent. In these situations, rather than containing only index links to the requirements tree and associated requirements context management data, it may be preferable to configure the decoder program and the requirements management program to work together to bundle an appropriately redacted version of the requirements into the metafile itself, or in an associated file intended to be linked to the metafile, creating an "annotated metafile".

This redacted version of the requirements tree would be automatically assembled by the steps of:
1: Determine which requirements-linked objects are being shown in the metafile
2: Extract the portion of the requirements tree that links to these objects
3: Redact this portion of the requirements tree according to the requirements context management data associated with the remote user.
4: Bundle this redacted requirements tree data with the metafile, creating an annotated metafile that can be sent directly to the user.

This approach has two advantages, these are: 1) higher security, because the metafile will not contain possibly sensitive requirements data that should not be exposed to the remote user; 2) faster response time, because the relevant redacted portions of the requirements list are already loaded on the user's computer.

In some cases, different users from different departments or different authority levels may use the remote user's computer. For example, a remote user terminal (computer) on a factory floor may be accessed by both design engineers, quality assurance personnel, factory supervisors and assembly workers. A design engineer may have requested a drawing, and the drawing metafile, and the less redacted engineering-level requirements tree data may be stored in the metafile cache on the remote user terminal. In a situation like this, it may not be desirable to expose the engineering-level requirements tree data to the factory supervisor. In situations like this, it may be convenient if the remote user terminal performs a second-level-requirements redaction step on the first-level redacted requirements tree stored in this remote user terminal, following requirements context management rules appropriate for the factory supervisor.

As previously discussed, the advantages of this approach (sending a metafile and associated first level redacted requirements tree data, and then doing a second redaction step on the metafile) are that the response time of the remote terminal is still extremely fast—only data stored in the local metafile cache needs to be retransmitted over the network). At the same time, security is preserved—at worst only the engineering level requirements list could ever be intercepted and deciphered by an unauthorized user.

Still, more refinements to this concept are possible, and can be provided by a system or method configured according to the invention. Like CAD drawings, requirements trees can change with time, and it may frequently occur that while the drawing of a CAD part may not change, the requirements tree linked to the CAD part may change. To cope with this type of situation, the data decoder program and requirements manager may be designed as to keep track of the status of the requirements tree that is associated with the metafile that has been cached on a remote user computer, and either force an update when the requirements tree changes, or alternatively inform the user that the requirements portion of the metafile is now out-of-date.

Although CAD files are frequently used as specific examples throughout, the system is not limited to CAD files. Essentially any type of PLM data element and file may be used in this manner.

In other embodiments of the invention, the requirements data from the RM may be "published", "pushed out" or "exported" to outside organizations in the supply chain. This would allow customers to export important requirements data to suppliers that use systems that exist outside of the customer's PLM. In still other embodiments of the invention, the requirements data could be exported to stand-alone universal document viewers, such as stand alone viewers that can read Adobe Acrobat ".pdf" files, as well as other CAD files. By exporting this requirements data to stand alone universal document viewers, users may be able to easily export relevant requirements data, and send this requirements data to outside suppliers, customers, government agencies, and the like. These outside users in turn will be able to review the linkage between the requirements data "intent" information and the context and content information with no additional equipment.

As one example of this type of data exchange, an engineer might decide to "publish" a requirements annotated CAD metafile as a type of enhanced stand-alone ".pdf" file. The engineer could then attach this requirements enhanced CAD metafile .pdf file to his email, and send it to a vendor or customer. The customer in turn could open the file using a stand alone ".pdf" reader, and see the requirements annotated data directly, without any need for the customer's computer to be electronically linked to the engineer's PLM system.

FIG. 1 is an overview of a PNM system configured according to the invention, showing how the connections between the PNM's product lifecycle manager, CAD file decoder modules, requirements modules, and individual CAD and requirements files act to create linkages between design intent and a product CAD drawing on a user's desktop.

In this example configuration, a user on a remote computer (101) is interacting with the PMN system 102 through a network (103). PMN system (102) typically consists of one or more networked servers containing computational systems and methods (not shown) and memory storage/database systems and methods (104).

In this example, a quality insurance worker, who is trying to determine the root cause behind various customer complains, has previously examined the complaints database managed by the product lifecycle manager module (105). The product lifecycle manager had previously sent complaint data from memory storage (104) to terminal 101. The user had used the PLM to correlate the complaints to a particular component (110). The PLM informs the user that the component (110) is composed of two different sub-components, the main component box (111) and a switch (112), and that the component is represented in two different drawings in two different CAD authoring software systems. The CAD software systems are CAD authoring system 1 (120) and CAD authoring system 2 (130). CAD system 1 represents the component box and switch as CAD files (121) and (122), and CAD system 2 represents the component box and switch as CAD files (131) and (132).

The PMN system also contains a requirements manager software module 140, which can be located on the same server(s) as the product lifecycle manager modules (105), or alternatively can be located on a different server that is connected (networked) with the product lifecycle manager module 105. The requirements manager manages the requirements tree for the project (not shown).

The product lifecycle manager (105) and the requirements manager (140) share responsibility for managing the attributes files that are associated with each one of the sub-components (111) and (112) of component (110). These attributes files can contain links to typical PLM data such as component vendors, specifications, complaint history, manufacturing schedule, etc. These attributes files also can contain links to typical RM (requirements manager) requirements data, such as links to specific locations in the requirements tree that specify the design requirement reasoning behind each of the components and subcomponents. Normally, the attributes files for the same object held in two different databases will contain links to the same PLM data and same RM design tree data, but because the CAD file formats are different, each CAD file will likely have its own attributes file list. The attributes files for subcomponents (111) and (112), associated with the CAD drawing in CAD software system 1 (120), are (141) and (142). The attributes files for subcomponents (111) and (112), associated with the CAD drawing in CAD software system 2 (130) are (143) and (144). PLM type data (vendor, parts specifications, etc.) data fields in these attributes files can be updated (107) by the PLM (105), and the requirements (requirements tree) links in these attributes files can be updated (147) by the RM (140). This way the requirements and specifications for each CAD file can be continually updated without altering the contents of the CAD file itself.

In this example, the user has directed the PLM (105) to retrieve a CAD drawing of the part for closer inspection. Based upon user choice for CAD format, the PLM (105) directs a CAD decoder and metafile creator module (150) retrieve the relevant CAD files and package them into a metafile format suitable for transmitting over the network (103), and viewing on the remote user computer (101). In this example, remote user computer (101) will usually have systems and methods (such as a Java application) to read the metafile, but usually will not have the ability to read the native CAD format directly.

In order to associate relevant portions of the requirements tree with the objects in the CAD metafile that represent the different subcomponents (111) and (112) of component (110), the CAD decoder (150) first determines which CAD objects are being packaged (embedded) in the metafile by examining the CAD files (151), (152); and then polls the requirements manager (140) to retrieve the parts of the requirement tree that pertains to component (110) and sub-components (111) and (112). The requirements manager responds to this request by querying (147) the attribute files (141) and (142) or (143) and (144) associated with the CAD objects embedded in the metafile. The requirements manager then sends (153) the relevant requirements tree data back to the CAD decoder (150), which packages and converts relevant portions of this requirements tree data into a form that can be either embedded in the decoded CAD metafile itself, or alternatively into a separate file that can later be easily linked to the CAD metafile by remote user computer (101).

Usually the CAD decoder (150) will then send (154) the requirements tree linked CAD metafile back to the main product lifecycle manager module (105), which will then send the requirements tree linked CAD metafile back over the network (103) to the remote user computer (101). The remote user can then easily inspect the CAD file, and perform queries to determine what the requirements tree reasoning was for the various elements of the CAD file. These requirements are shown as text (109).

Figure 2:
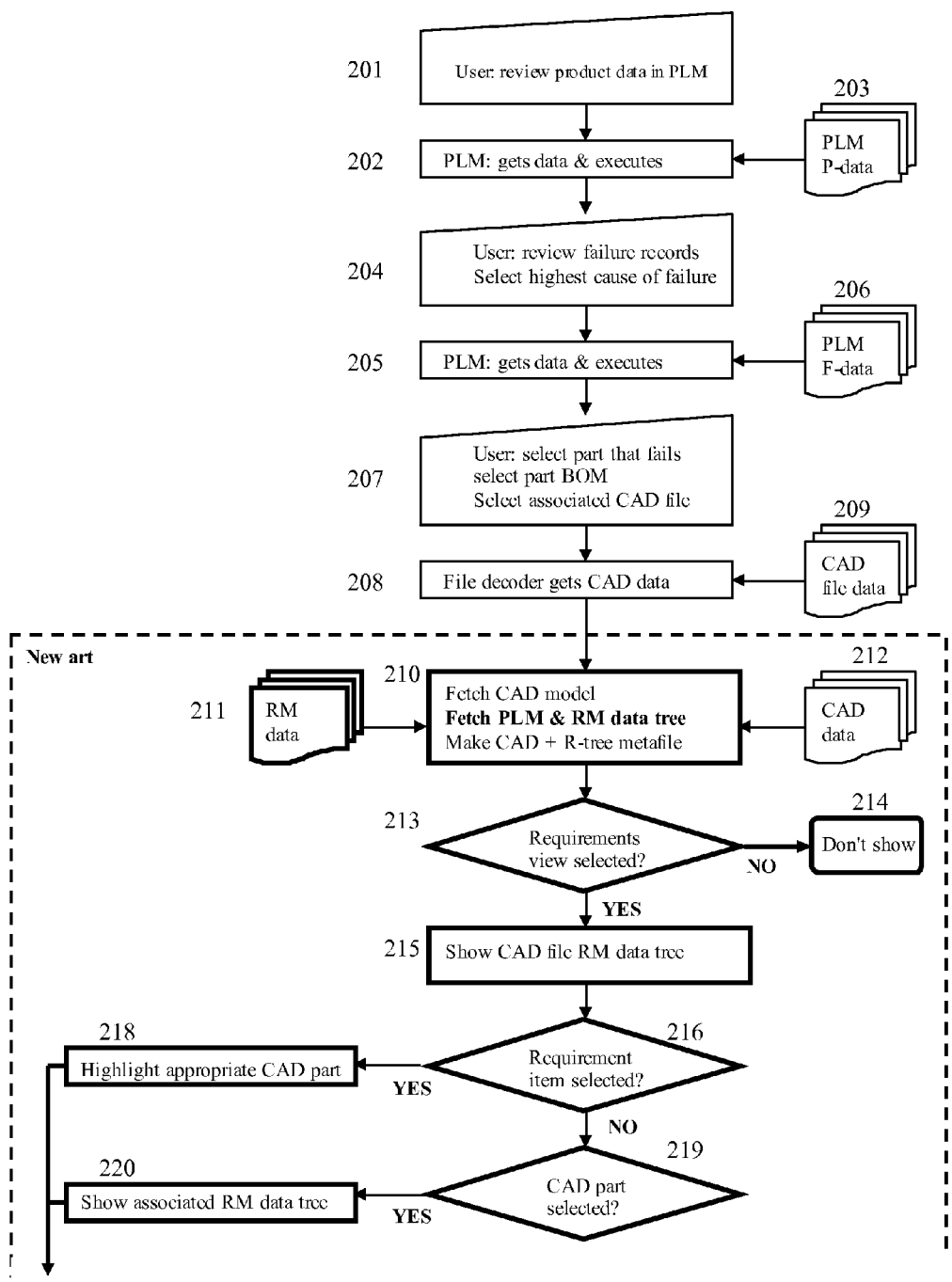
FIG. 2 is a flow chart showing how program flow switches between a customer complaint or failure records module located in a PLM according to the invention, a manufacturing BOM module in a PLM, and a requirements module as an organizational employee (user) works to understand the root cause of various complaints.

FIG. 2 is a flow chart showing one embodiment showing how program flow switches between a failure records module located in a PLM, a manufacturing BOM module in a PLM, and a requirements module as a user works to understand the root cause of various complaints, and to determine if the various components of a product are working in a way that is consistent with the overall product design intent. In this figure, a user running a remote computer connected to a PNM system via a network has decided to review recent product performance data using a product lifecycle manager (PLM). The user requests data (201). The PLM software interprets this request (202), and retrieves general product data "P-data" (203) from a product database. Using this overall product performance "dashboard" displayed by the PLM, the user decides to focus on product failure records (204), and requests that the PLM focus on this area. The PLM receives this command (205) and executes it by retrieving the product failure and complaint data "F-data" from the appropriate database (206).

The PLM then displays the failure data on an appropriate dashboard or display (207). The user uses the PLM display to determine which part is most likely to fail, and then also uses the PLM to pull up the bill of materials (BOM), that has a master record of all the various components used with the product. The user then selects a particular component for further inspection, and requests the CAD file.

Upon receiving this CAD file request (208), the file decoder retrieves the appropriate CAD file (209) (which could be located on network connected server far away from where the user is working).

Unlike prior art PLM systems, which would then simply transfer a translation of the CAD file to the user, the methods of the invention will usually go one step further, and create an indexed or annotated CAD metafile that also contains links to the relevant portions of the product or project requirements tree. To do this (210), the file decoder retrieves both the CAD file data (212) and the requirements tree data from the requirements manager (211), selectively exposes or redacts this requirements tree according to predetermined criteria (discussed elsewhere), and then either embeds the requirements data into the CAD metafile (requirements tree annotated metafile), or alternatively creates a new type of CAD metafile that contains links to relevant portions of the requirements tree (requirements tree indexed metafile).

The remote user has the option to either view or not view the requirements tree associated with the CAD file he is viewing (213). If this is turned off (214), the system doesn't show the requirements. If it is turned on however (215), the system makes a context sensitive requirements tree available to the CAD user. This context sensitive tree may be set to be responsive to mouse commands (i.e. clicking on a part), keyboard entries (typed inquiries), clicking on radio buttons or check boxes, gestures, spoken commands (e.g. a verbal "show requirements for part X"), haptic glove command, or other input means. In this example, the user's local system (using Java application scripts or other means) determines if a part with an associated linked requirements tree is being selected (216), and if so highlights the part (218) on the users screen. If the user selects the part (219) by, for example, clicking on the part with a mouse, the user's local system will either follow the metafile requirements link to the appropriate part of the requirements tree, or alternatively retrieve a portion of the requirements tree that is embedded in the metafile, and show the requirements to the user (220).

Figure 3:
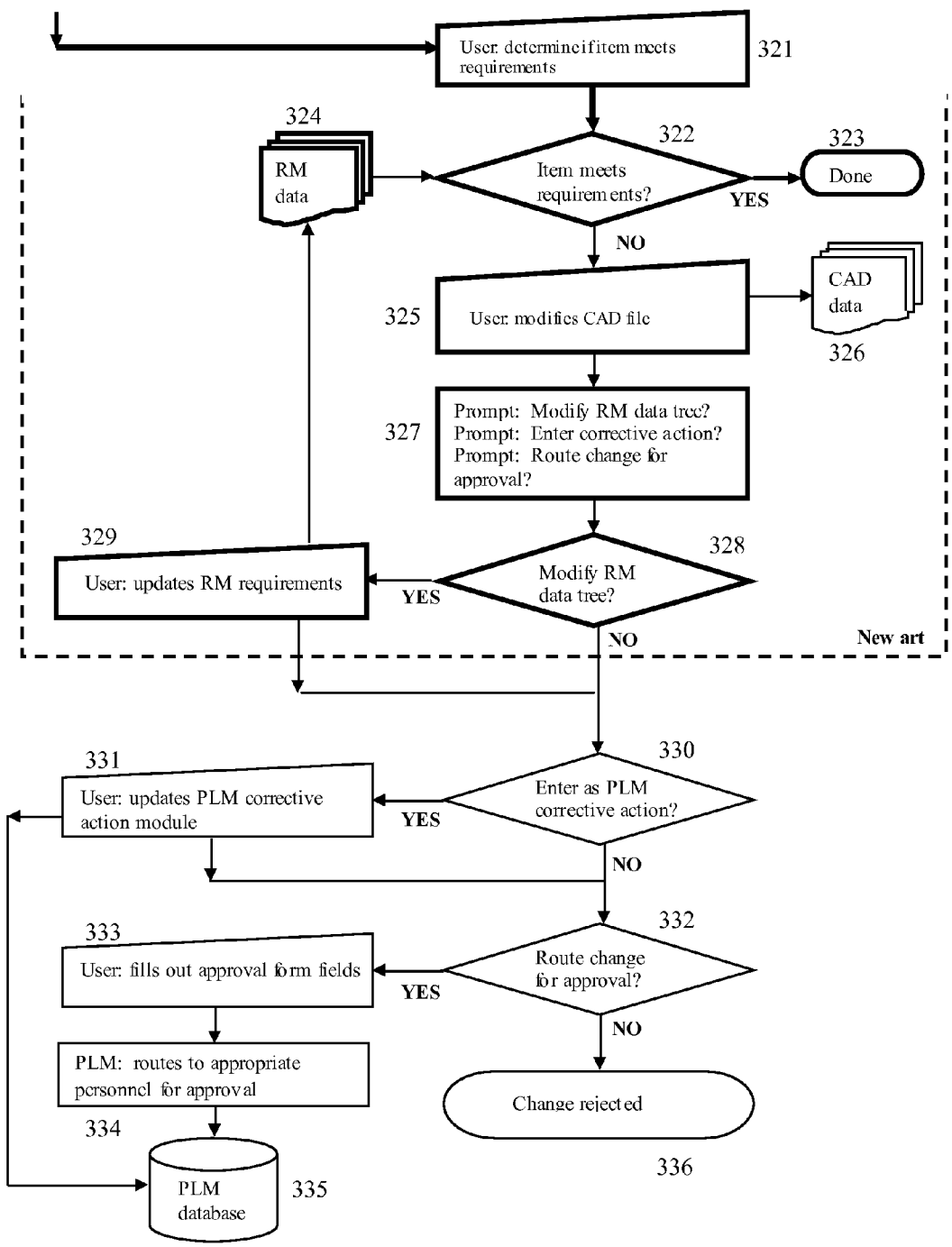
FIG. 3 is a flow chart showing how program flow switches between a requirements module, and a CAD file server located in a PLM according to the invention, as a user inspects the various components of a product, and determines if the components are working according to design intent.

FIG. 3 is a continuation of the flow chart shown in FIG. 2. FIG. 3 shows how program flow switches between a requirements module, and a CAD file server located in a PLM, as a user inspects the various components of a product, and determines if the components are working according to design intent. Here the user has determined that the design requirements and/or the actual component design need to be modified, and has initiated changes in the design requirements through the requirements module, and has also initiated an engineering change order report and a corrective action report through the corrective action and approval modules of the PLM.

Here (321), the user has pulled up the CAD file for a component that the PLM had previously flagged as being problematic from a failure rate standpoint. The user is examining the CAD file, examining the requirements tree associated with this part of the CAD file, and based upon the requirements tree and the PLM failure rate data is determining if some sort of corrective action is required.

If the user determines (322) that the requirements are correctly stated, and the item being inspected appears to meet the requirements, the user is done (323). The user will presumably exit this part of the module and move on to something else.

For this example, it is assumed that the user is a design engineer, has determined that requirements tree appears reasonable, but that the design of the part does not meet the requirements. The user performs corrective action (325) by using an engineering part of the PLM to modify the design of the part, and saves the updated design as a preliminary version in the CAD data file (326).

The system determines that the user has an appropriate authority to make a preliminary design change. It detects that a change has been initiated, and automatically queries the user to see if the requirements tree needs to be updated as a result of the change (327). It also prompts the user to fill out a corrective action form, and fill out the appropriate approval forms.

In this example, the user has determined that the requirements tree needs to be updated. This could be because the original requirements were incomplete and additional requirements need to be added, or alternatively because some higher-level change in the requirements tree has caused a formerly adequate part to now become inadequate. In any event, in (328), the system asks if the user wants to modify the requirements tree. Assuming yes, then the user up dates the appropriate portion of the requirements tree (329), and the system begins the process needed to integrate this proposed change into the official requirements tree data (324).

After this is done, the system then acts in a way that is generally equivalent to a prior art PLM system. The PLM asks the user if the PLM electronic corrective action form should be completed (330). Assuming that the answer is yes, the user completes the relevant fields in this form (331) and transfers the data to the PLM database (335). In this example, irrespective of if a corrective action form is filled out or not the PLM then prompts the user to proceed with filling out an appropriate approval form (332). Assuming that the user wants to do this, the user fills out the appropriate form fields in the PLM electronic change approval module (333), and then routes the proposed change to the personnel that the PLM module shows are needed to approve the change (334). The PLM database (335) then keeps track of this approval process.

If the user decides not to route the change for approval, the PLM will reject the change (336), and instead keep the proposed change in a "draft" folder for a preset period of time, and then discard.

Figure 4:
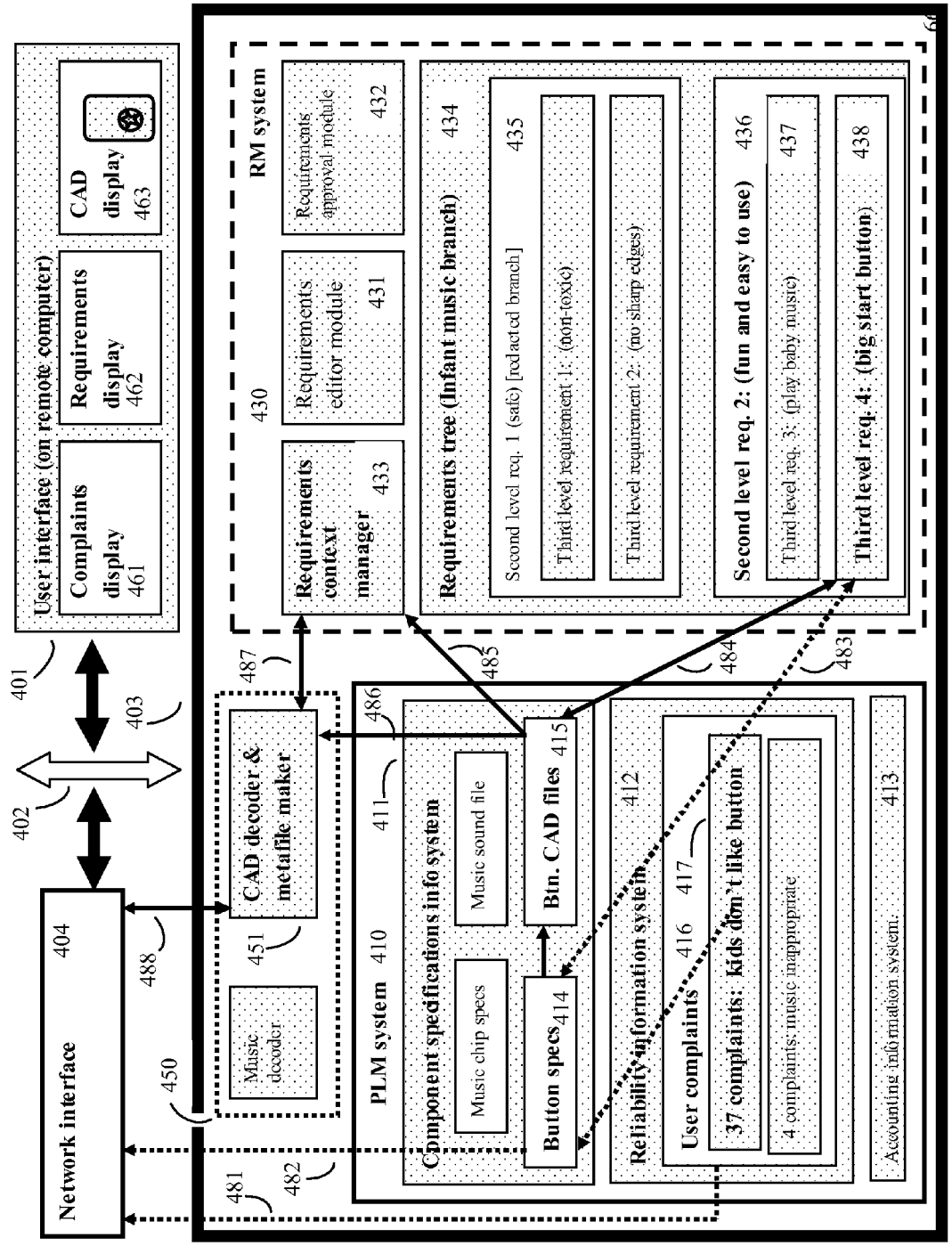
FIG. 4 shows an overview of how the various software modules in a PLM according to the invention and a requirements module (RM) interact to form an integrated product network manager.

FIG. 4 shows an overview of how the various software modules in an example PLM and a requirements module (RM) interact to form an integrated product network manager (PNM). The diagram also shows data flow between various modules of the system as a user investigates how best to respond to various customer product complaints.

In this diagram, a user on a remote computer (401) attached to a network (402) is communicating to a program network manager (PNM) system (403) via the PNM's network interface (404). The PNM (403), which is composed of a series of interconnected software program modules, is typically hosted on one or more computer servers (not shown). These servers will typically have computational systems and methods (often multiple microprocessors chosen from the MIPS, PowerPC, x86, Alpha, or ARM architectures and instruction sets will be used for this purpose, but any processor architecture and instruction set capable of addressing large (100 megabytes or more) database systems will work). The PMN server or servers will typically have access to mass memory storage, such as hard disks, optical disks, solid state storage, or other computer memory storage capable of storing large (100 megabytes or more, usually gigabytes or terabytes) amounts of data.

The network (402) is preferably a broadband network capable of connecting to users affiliated with the organization running the PNM regardless of location. Often the network will be the Internet—a worldwide network of computers connected using the TCP/IP method. However other networks, including narrow band connections such as telephone lines, satellite cell phone connections, and/or other data exchange modalities not connected with the Internet may also be used.

The user computer (401) typically will contain a user display such as a flat panel display or CRT, but may also communicate using sound or other signals. The user computer will typically contain a user data input, such as a keyboard, bar code scanner, RFID reader, microphone, video camera, mouse, or other means to enter data into the user computer. The user computer will also usually contain some local computing means, such as a microprocessor, with sufficient computing power to retrieve data from the network and display it to the user, and to translate user input data into a form suitable for transmitting over a network. The user computer will also typically contain at least enough memory to perform its network data transfer tasks. In a preferred embodiment, the user computer has some persistent memory, such as hard drives, flash memory, or the like, to enable the computer to save at least some data between user sessions.

The product network manager (PNM) (403) is itself composed of three main software modules. These are the product lifecycle management (PLM) module (410), the requirements manager (RM) module (430), and the data decoder (DD) module (450). These three software modules (PLM, RM, DT) may either be hosted on the same server, or alternatively be hosted on different servers connected by a network.

The PLM (410) is itself composed of various levels of other software modules (programs). Examples of typical PLM high-level modules include component specifications information systems (411), reliability information systems (412), accounting information systems (413), and many other modules not shown in this diagram, such as manufacturing control systems, vendor management systems, personnel management systems, customer management systems, and so on.

The PLM component specifications information system (411) contains a database that stores data for the various components of the products or systems that the organization that runs the PLM wishes to manage. In this example, the organization is producing electrical components for automobile sound systems, and as a result is storing specifications for the sound system buttons (414) and CAD file drawings of these buttons (415). In this example, component specification system (411) is also storing music chip sound specifications (not numbered), and as well as the specification for other components of the sound system, such as the case (not shown).

The PLM reliability information system (412) contains quality assurance data and also a customer complaint database (416). Here, complaints are sorted into general categories (e.g. "kids don't like the button" (417), "the music is inappropriate", etc.).

The requirements manager (RM) module (430) also is broken into several major components. These include a requirements editor module (431), a requirements approval module (432), and something new to this art, a requirements context manager (433). The requirements editor (431) and the requirements approval module (432) manage the requirements tree database (434).

The requirements tree database (434) contains the list of the various project requirements configured as a branching list, with the largest (most global, or fundamental) assumptions at the top of the list, and sub-requirements for each major requirement branching out from the major requirements. The database also keeps tracks of links between branches, such as when, for example, a lower level requirement depends upon two major branches. In this child's music player example, one major requirement is that the device is safe (435), and a second major requirement is that the device be fun and easy to use. (436). The second major requirement (436) in turn presently has two dependent third-level requirements: that the device plays baby music (437) (the intended market is for a sound module for a built-in automobile infant seat), and that the device has a big start button (438).

The data decoder module (450) is designed to retrieve product and process records from the PLM database, which often, for example, may be CAD files drawn from many different and incompatible CAD software systems, and decode these files into a universal "metafile" format suitable to transmitting to remote user computers (401) over a network (402). This "metafile" format allows the user operating remote computer (401) to read many different types of CAD files from many different systems, as well as other types of files, without having to load the expensive native CAD software on his computer. For purposes of this example, we will focus on the CAD format decoder and metafile maker software portion (451) of data decoder module (450).

The PNM system sends data from all of these modules to remote user computer (401) over a network such as the Internet (402). In this example, the PNM is sending three specific views of its various types of data to the user, which is shown in three fields in the user display. One is a view of the product's complaint database (461), another view is a portion of the product requirements tree (462), and another is a view of a CAD file associated with a part of interest to the user (463).

The data flow in this example roughly follows portions of the scenario previously shown in FIGS. 2 and 3. A user, interested in understanding the root causes of various customer complaints, and possibly doing corrective action on these complaints, is using the system. The user might start by querying the PLM system's reliability information system (412), and look at the user complaints database (416). This database sends the requested information (481) to the network interface (404), which sends the information to the complaints display (461) on user computer (401).

The user, seeing that there are a large number of complaints about the button (417), then decides to see what the problem is. The user decides to query the component specifications information system (411) of the PLM (410), and makes a specific inquiry for the button component. The PLM sends (482) the button specifications (414) to the user via the usual network interface (404). These button specifications are associated with CAD drawings of the button in various formats (415).

Here, the requirements manager portion (430) of the PNM system helps the user understand the root cause of the customer complaints, and also helps the user decide how best to do corrective action to resolve these customer complaints. Unlike prior art PLM systems, the PNM system can be configured to automatically send users portions of the requirements tree that are linked to the problems that they are working on. Thus in this example, when the user queried the component specifications system (411) for the button specifications (414), the system requirements manager system (430) automatically pulled the portion of the requirements tree (434) that contained the branch of the tree (436) related to button requirements (438) and sent this data (483) to the PLM system (410), which packaged this portion of the button requirements tree in with the button specifications (414) and sent this data (482) to the remote user (401) as well. This portion of the button requirements specifications tree shows up on a different field (462) on the user's display on user computer (401).

The user decides to investigate to see if the problem lies in the design of the button. To do this, he calls up CAD button design files, which may be in various associated CAD file formats. These CAD files are handled by the PLM (410). The PLM links the button CAD files (415) to the button specifications data (414). Thus the user can find the CAD files as a subfield in the button specifications data, and select this field.

Here again, the requirements manager module (430) of the PNM system helps the user use the CAD files to understand how best to resolve the customer complaint problem. Instead of just sending a unannotated copy of the CAD file to the user, the PNM system sends a copy of the CAD file to the user that is annotated with selected portions of the requirements tree relevant to the parts that are displayed on the user's computer. (By contrast, in a prior art system, this CAD file would be sent (486) to the CAD decoder portion (451) of a file decoder (450), where it then would be decoded into an appropriate metafile format without any associated requirements data).

To do this requirements tree annotation, the RM system (430) contains previously established links between various CAD system elements, and portions of the requirements tree. Thus when the user requests a particular button CAD file (415), the requirements manager automatically links (484) the button portion of the user requirements tree (438) to this file.

Here however, the PNM system has some decisions to make. A user inspecting a CAD file will not want to see the entire product or project requirements tree when inspecting a part, as this would be overwhelming. At the same time, management may also wish to redact or hide certain portions of the requirements tree from certain users (e.g. vendors) as confidential. Another problem is that the user will usually only be inspecting parts of the CAD file at any given time, and will generally not wish to clutter his screen with requirements data for CAD parts that are off-screen at that particular instant.

To manage this complexity, the file data (415) and the relevant portions of the requirements tree (438) are sent (485) to a "requirements context manager" software module (433). This requirements context manager exchanges data (487) with the CAD decoder and metafile maker (451), and determines which requirements linked elements of the CAD file of interest are being bundled for metafile transmission to user computer (401).

The requirements context manager (433) selects portions of the requirements tree to bundle with the decoded CAD metafile. This selection process, which is described in more detail elsewhere, works by examining the links between the CAD design elements and the various requirement tree branches, and selects those branches that are parental (provide requirements for) the CAD design parts that are being packaged in that particular metafile. Thus if a CAD drawing contained two requirements linked elements, but the metafile being transmitted only had one of these elements, the requirements context manager would generally only select the requirements tree data associated with that particular element.

The requirements context manager (433) would preferably also examine various predetermined rules to further define what portions of the requirements tree to bundle with the metafile. For example, the predetermined rules might tell the context manager (433) to redact portions of the design tree that are considered to be confidential for business reasons.

Thus the in-house vice president of engineering might be allowed access to the full requirements list, an in-house design engineer might be allowed access to the requirements list with a few elements (perhaps an unannounced feature) redacted, and an engineer at a vendor might get a more extensively redacted list. This redaction process will normally consist of evaluating the access level of the user (department, level in the organization) and employer of the user (same organization, established vendor, previously unaffiliated vendor wishing to bid, etc.).

After the requirements context manager (433) has selected the appropriate requirements from the requirements tree, these requirements are then sent (487) to the CAD decoder and metafile maker (451). CAD decoder (451) then creates a requirements list annotated CAD drawing metafile and transmits this (488) to the network interface (404) for transmission to the user computer (401), where it will usually appear in a CAD display window (463).

The requirements list annotated CAD metafile will normally consist of at least links between design elements in the metafile and selected portions of the requirements tree. Alternatively, as discussed elsewhere, the selected portions of the requirements tree data can be included in the metafile, allowing relevant requirements data to be rapidly viewed on the user computer (401) with minimal network transmission latency delays.

Once sent to user computer (401), the requirements tree can be viewed in a number of different ways. It can be displayed in a separate requirements display list field (462). Alternatively, the user may desire to configure the display system on computer (401) so that clicking or moving a mouse over objects of interest in the CAD display window or field (463) reveals the requirements tree in the form of a pop-up, verbal prompt, or other display means. In yet another embodiment, the requirements tree may associated with the CAD file and published as a stand-alone ".pdf" type document, intended for export to outside computers, and viewed by a stand alone reader.

Figure 5:
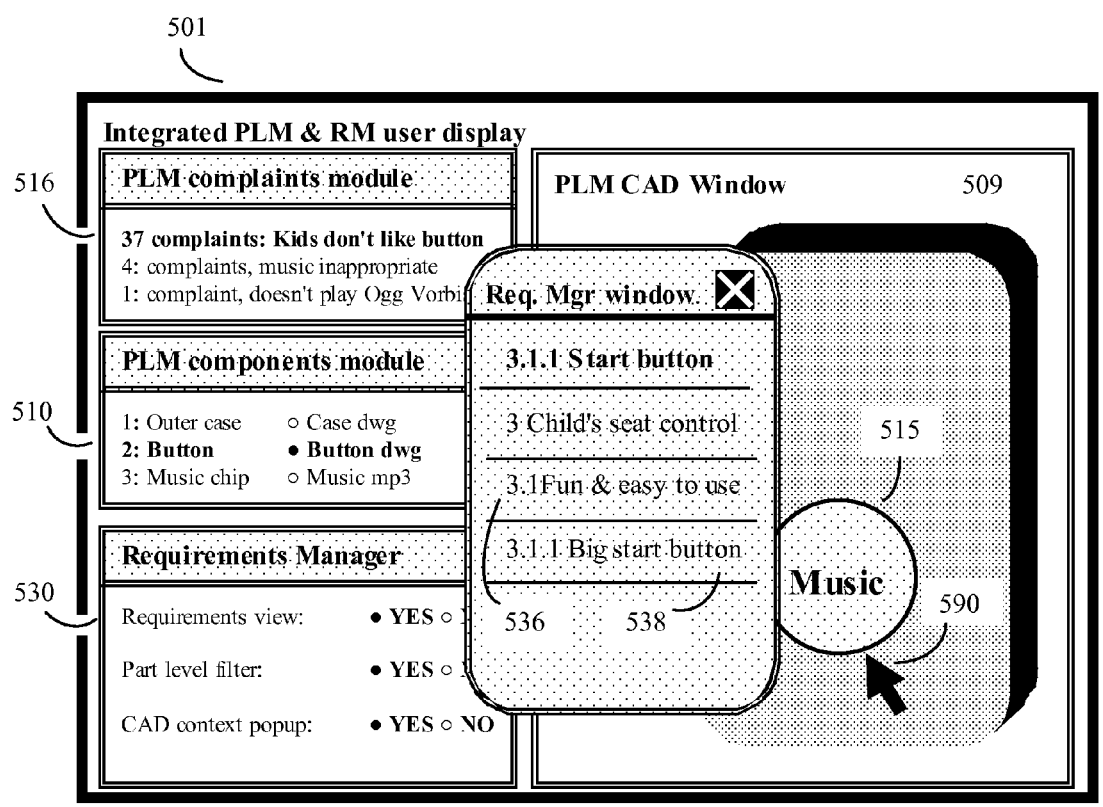
FIG. 5 shows a close up of a user's computer video screen according to the invention.

FIG. 5 shows an example of the sort of screen (501) that might be displayed in the user interface of the remote user computer previously shown in FIG. 4 (401). In this example, as in FIG. 4, a user who wants to determine the root cause of various customer product complaints has queried the PNM regarding user complaints (516), and is following up on the most frequent user complaint, that "Kid's don't like the button" by pulling up the components for the unit (510). The user has further requested that the PNM send over a CAD drawing of the unit (509) that contains the button (515) that "Kid's don't like".

The user has further instructed his computer through field (530) to display the annotated requirements trees associated with various elements of the CAD display (509). In this example, user specified this by clicking "yes" to the "requirements view, part level filter, and CAD context popup radio buttons in field (530). The user has then moved his mouse (590) over to the button of interest (515), in this case exposing the relevant portions of the button requirements tree. This exposes the requirement that the button should be big (538), but also exposes the higher level elements on the requirements tree (536), that the control should be "fun and easy to use." The user, reading the requirements more closely, finds that the control is for an infant seat (not shown). This previously hidden higher level information—that the button is intended for infants and toddlers, and that it should be fun and easy to use, may lead the user to the root cause of the problem: infants and toddlers can't read, and may find the adult "Music" label lettering to be dull and unattractive. Here the proper corrective action is to make the button labeling more age appropriate.

Here, the PMN system demonstrates its worth. It presents all the critical elements of the problem—complaints, design, and original design intent to the user at the same time, and greatly speeds up the corrective action process for this particular problem.

Figure 6:
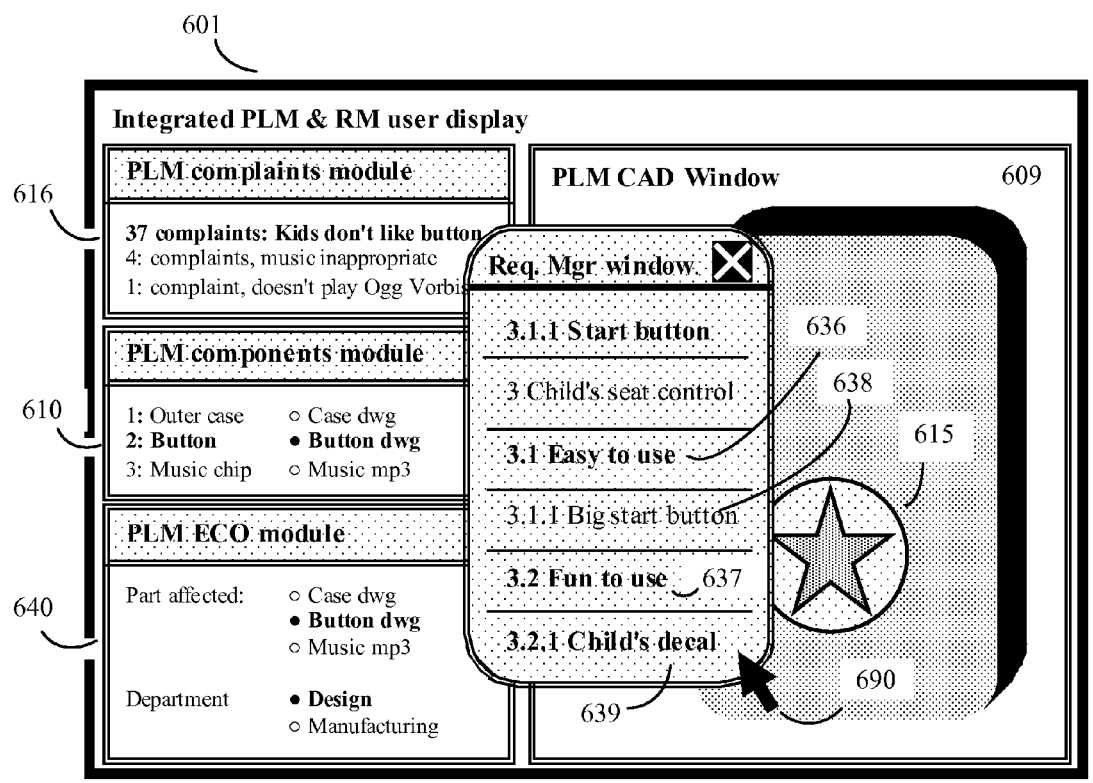
FIG. 6 shows the same video screen as FIG. 5, but a few minutes later.

FIG. 6 shows the same video screen as FIG. 5 some time later, showing the user in the middle of using the PNM to do corrective action. Here (601) is the display on the user's computer. The user complaints data (616) and the unit's components list (610) are still up on the screen, as is the CAD drawing (609) showing button (615).

However, there have been some changes. The user has used the CAD window (609) to modify the decal design for button (615) from the earlier and more adult "Music" text decal to a more infant and toddler friendly graphic design (the star shown on (615)).

Further, the user has decided that at least part of the problem was due to lack of clarity in the button branch of the requirements tree. Whereas earlier, the higher-level requirement for the button was that the button be "Fun and easy to use" (see FIG. 5 (536)), the user has decided that this single higher-level requirement was too vague. For example, a button can be easy to use but not fun, fun to use but not easy, both easy and fun to use, or neither easy nor fun to use. In this case, the customer complaints were due to the fact that the button was easy to use, but not fun (infants found the decal to be unattractive). Thus both the button and the requirements tree need to be corrected.

In order to do the corrective action on the button decal design, the user has first modified the button design itself, (615), and is now in the process of attempting to make this change official by submitting this change as an engineering change order (ECO) through a field on his display (640) that links through to the PLM ECO module on the server previously shown in FIG. 4 (403) and FIG. 1 (102). Here he has checked radio buttons indicating that he wants to alter the button drawing, and that this change is being sent to the design department for approval.

To begin the process of changing the button part of the requirements tree, the user is also starting to edit the requirements tree pop-up on his display. In particular, the user has decided to split the higher-level requirement "Easy and fun to use" (FIG. 4 (536)), and turn it into two higher-level requirements: "Easy to use" (636) and "Fun to use" (637). The "Big start button" requirement (638) is now dependent to the higher level "Easy to use" requirement (636). The new change, adding a child's decal, has been put as a new requirement (639) that is dependent to the new higher-level requirement, "Fun to use" (637). The user has done this because he wants later designers to understand the underlying logic behind his design change.

Later on, the designer might follow up on the "music inappropriate" complaints by playing the sound chip music clip through the PLM's music decoder software, and perhaps discover that it is playing "house of the rising sun" instead of "Pop goes the weasel". This might lead to another ECO and the addition of an "age appropriate" higher-level specification to the requirements manager.

In either of these embodiments, the various components or process steps may be rearranged or interchanged depending on a particular application, and those skilled in the art will understand that such changes can be made without departing from the spirit and scope of the invention, which is defined by the appended Claims and their equivalents.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a system and method for linking one or more requirements trees to database elements, where the database elements are selected from the group consisting of product lifecycle management database entries, process specification files, and product specification files. Although this embodiment is described and illustrated in the context of devices, systems and related methods of product lifecycle management, the scope of the invention extends to other applications where such functions described herein are useful. Furthermore, while the foregoing description has been with reference to particular embodiments of the invention, it will be appreciated that these are only illustrative of the invention and that changes may be made to those embodiments without departing from the principles of the invention.

The invention claimed is:

1. A method for managing product networks, the method comprising:

receiving, at one or more computer systems, a request to access one or more product files stored as database elements in a central database, wherein the database elements are produced from a multiplicity of different native authoring programs providing a multiplicity of different file types;

retrieving, by one or more processors associated with the one or more computer systems, the database elements from the central database;

receiving, at the one or more computer systems, information linking one or more requirement trees produced by requirement management software to the database elements; and generating, by the one or more processors associated with the one or more computer systems, a metafile according to a common metafile type configured to be viewed by users without the native authoring programs based on the database elements and the information linking the one or more requirement trees produced by the requirement management software to the database elements;

wherein one or more sections of the metafile are configured to retrieve one or more portions of the one or more requirement trees produced by the requirement management software according to a requirements tree context manager evaluating a set of predetermined rules to determine which portions of the one or more requirements trees are exposed to the users; and wherein the generating, by the one or more processors associated with the one or more computer systems, of the metafile according to the common metafile type configured to be viewed by users without the native authoring programs based on the database elements and the information linking the one or more requirement trees produced by the requirement management software to the database elements comprises exposing one or more subtrees of the one or more requirements trees.

2. The method of claim 1, wherein generating, by the one or more processors associated with the one or more computer systems, the metafile according to the common metafile type configured to be viewed by users without the native authoring programs based on the database elements and the information linking the one or more requirement trees produced by the requirement management software to the database elements comprises exposing all of the one or more requirements trees without redacting any portions of the one or more requirements trees.

3. The method of claim 1, wherein the requirements tree context manager evaluates the set of predetermined rules to determine how much of the requirements tree to expose based upon predetermined linkages between the database elements and the one or more requirements trees and to redact portions of the one or more requirements trees that do not set requirements for one or more of the database elements.

4. The method of claim 1, wherein the requirements tree context manager evaluates the set of predetermined rules to determine how much of the requirements trees to redact or expose based upon criteria selected from a group consisting of management security lockouts, user organization, user department, and user access level.

5. The method of claim 1, wherein the requirements tree context manager evaluates the set of predetermined rules to further determine how much of the requirement trees previously redacted or exposed by the set of predetermined rules to further redact or expose in a second-level redaction, the second-level redaction being based on criteria selected from a group consisting of mouse over commands, mouse button click commands, mouse wheel commands, mouse gesture commands, light pen button commands, verbal commands, pointing commands, haptic device commands, keyboard buttons, and pull-down menus.

6. The method of claim 1, wherein the database elements comprise data selected from a group consisting of product data, supply chain data, component part data, subcontracting company data, partnership data, design data, development data, access privilege data, trade secret data, confidential information data, business relationship data, business documents data, business agreements data, OEM products and components data, CEM products and components data, bill of material data, change order data, component part object data, component part linking data, component part identification data, component part number data, part attribute data, part affiliation data, part product context data, specifications drawing data, color data, size data, type data, price data, quantity data, find number data, cross-reference data, related information data, earlier version data, history of change data, text document data, graphics drawing data, other attribute data, redacted data, discovery privilege data, cost data, component parts specifications data, product specifications data, quantity received data, quantity needed data, availability data, supplier type data, geographical information, and purchase order data.

7. A non-transitory computer-readable medium storing computer-executable code for managing product networks, the non-transitory computer-readable medium comprising:

code for receiving a request to access one or more product files stored as database elements in a central database, wherein the database elements are produced from a multiplicity of different native authoring programs providing a multiplicity of different file types;

code for retrieving the database elements from the central database;

code for receiving information linking one or more requirement trees produced by requirement management software to the database elements; and code for generating a metafile according to a common metafile type configured to be viewed by users without the native authoring programs based on the database elements and the information linking the one or more requirement trees produced by the requirement management software to the database elements;

wherein one or more sections of the metafile are configured to retrieve one or more portions of the one or more requirement trees produced by the requirement management software according to a requirements tree context manager evaluating a set of predetermined rules to determine which portions of the one or more requirements trees are exposed to the users; and wherein the code for the generating of the metafile according to the common metafile type configured to be viewed by users without the native authoring programs based on the database elements and the information linking the one or more requirement trees produced by the requirement management software to the database elements comprises code for exposing one or more subtrees of the one or more requirements trees.

8. The non-transitory computer-readable medium of claim 7, wherein code for generating the metafile according to the common metafile type configured to be viewed by users without the native authoring programs based on the database elements and the information linking the one or more requirement trees produced by the requirement management software to the database elements comprises code for exposing all of the one or more requirements trees without redacting any portions of the one or more requirements trees.

9. The non-transitory computer-readable medium of claim 7, wherein the requirements tree context manager evaluates the set of predetermined rules to determine how much of the requirements tree to expose based upon predetermined linkages between the database elements and the one or more requirements trees and to redact portions of the one or more requirements trees that do not set requirements for one or more of the database elements.

10. The non-transitory computer-readable medium of claim 7, wherein the requirements tree context manager evaluates the set of predetermined rules to determine how much of the requirements trees to redact or expose based upon criteria selected from a group consisting of management security lockouts, user organization, user department, and user access level.

11. The non-transitory computer-readable medium of claim 7, wherein the requirements tree context manager evaluates the set of predetermined rules to further determine how much of the requirement trees previously redacted or exposed by the set of predetermined rules to further redact or expose in a second-level redaction, the second-level redaction being based on criteria selected from a group consisting of mouse over commands, mouse button click commands, mouse wheel commands, mouse gesture commands, light pen button commands, verbal commands, pointing commands, haptic device commands, keyboard buttons, and pull-down menus.

12. The non-transitory computer-readable medium of claim 7, wherein the database elements comprise data selected from a group consisting of product data, supply chain data, component part data, subcontracting company data, partnership data, design data, development data, access privilege data, trade secret data, confidential information data, business relationship data, business documents data, business agreements data, OEM products and components data, CEM products and components data, bill of material data, change order data, component part object data, component part linking data, component part identification data, component part number data, part attribute data, part affiliation data, part product context data, specifications drawing data, color data, size data, type data, price data, quantity data, find number data, cross-reference data, related information data, earlier version data, history of change data, text document data, graphics drawing data, other attribute data, redacted data, discovery privilege data, cost data, component parts specifications data, product specifications data, quantity received data, quantity needed data, availability data, supplier type data, geographical information, and purchase order data.

13. A system for managing product networks, the system comprising:
 a processor; and
 a memory, in communication with the processor, and configured to store a set of instructions which when executed by the processor configure the processor to:
  receive a request to access one or more product files stored as database elements in a central database, wherein the database elements are produced from a multiplicity of different native authoring programs providing a multiplicity of different file types;
  retrieve the database elements from the central database;
  receive information linking one or more requirement trees produced by requirement management software to the database elements; and
  generate a metafile according to a common metafile type configured to be viewed by users without the native authoring programs based on the database elements and the information linking the one or more requirement trees produced by the requirement management software to the database elements;
 wherein one or more sections of the metafile are configured to retrieve one or more portions of the one or more requirement trees produced by the requirement management software according to a requirements tree context manager evaluating a set of predetermined rules to determine which portions of the one or more requirements trees are exposed to the users; and
 wherein the generating of the metafile according to the common metafile type configured to be viewed by users without the native authoring programs based on the database elements and the information linking the one or more requirement trees produced by the requirement management software to the database elements comprises exposing one or more subtrees of the one or more requirements trees.

14. The system of claim 13, wherein the processor is configured to generate the metafile according to the common metafile type configured to be viewed by users without the native authoring programs based on the database elements and the information linking the one or more requirement trees produced by the requirement management software to the database elements by exposing all of the one or more requirements trees without redacting any portions of the one or more requirements trees.

15. The system of claim 13, wherein the requirements tree context manager evaluates the set of predetermined rules to determine how much of the requirements tree to expose based upon predetermined linkages between the database elements and the one or more requirements trees and to redact portions of the one or more requirements trees that do not set requirements for one or more of the database elements.

16. The system of claim 13, wherein the requirements tree context manager evaluates the set of predetermined rules to determine how much of the requirements trees to redact or expose based upon criteria selected from a group consisting of management security lockouts, user organization, user department, and user access level.

17. The system of claim 13, wherein the requirements tree context manager evaluates the set of predetermined rules to further determine how much of the requirement trees previously redacted or exposed by the set of predetermined rules to further redact or expose in a second-level redaction, the second-level redaction being based on criteria selected from a group consisting of mouse over commands, mouse button click commands, mouse wheel commands, mouse gesture commands, light pen button commands, verbal commands, pointing commands, haptic device commands, keyboard buttons, and pull-down menus.

18. The system of claim 13, wherein the database elements comprise data selected from a group consisting of product data, supply chain data, component part data, subcontracting company data, partnership data, design data, development data, access privilege data, trade secret data, confidential information data, business relationship data, business documents data, business agreements data, OEM products and components data, CEM products and components data, bill of material data, change order data, component part object data, component part linking data, component part identification data, component part number data, part attribute data, part affiliation data, part product context data, specifications drawing data, color data, size data, type data, price data, quantity data, find number data, cross-reference data, related information data, earlier version data, history of change data, text document data, graphics drawing data, other attribute data, redacted data, discovery privilege data, cost data, component parts specifications data, product specifications data, quantity received data, quantity needed data, availability data, supplier type data, geographical information, and purchase order data.

* * * * *

UNITED STATES PATENT AND TRADEMARK OFFICE
CERTIFICATE OF CORRECTION

PATENT NO. : 8,412,741 B2
APPLICATION NO. : 11/779039
DATED : April 2, 2013
INVENTOR(S) : Hein It is certified that error appears in the above-identified patent and that said Letters Patent is hereby corrected as shown below:

Drawings:

On sheet 3 of 6, Box 321, in figure 3, line 1, delete "determineifitem" and insert -- determine if item --, therefor.

In the Specifications:

In column 1, line 26, delete "marketing" and insert -- marketing, --, therefor.

In column 1, line 65, delete "rep lacing" and insert -- replacing --, therefor.

In column 5, line 42, delete "[RHOS]" and insert -- [ROHS] --, therefor.

In column 7, line 15, delete "app ears" and insert -- appears --, therefor.

In column 9, line 37, delete "version" and insert -- version. --, therefor.

In column 10, line 12, delete "apart" and insert -- a part --, therefor.

In column 11, line 38, delete "though" and insert -- through --, therefor.

In column 11, line 54, delete "app ear" and insert -- appear --, therefor.

In column 12, line 54, delete "up on" and insert -- upon --, therefor.

In column 13, line 1, delete "On" and insert -- One --, therefor.

In column 13, line 6, delete "up on" and insert -- upon --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,412,741 B2

In column 14, line 43, delete "long-fife" and insert -- long-life --, therefor.

In column 17, line 62, delete "metafile" and insert -- metafile. --, therefor.

In column 17, line 64, delete "objects" and insert -- objects. --, therefor.

In column 25, line 3, delete "up on" and insert -- upon --, therefor.

In column 26, line 45, delete "up on" and insert -- upon --, therefor.

In column 27, line 14, delete "up on" and insert -- upon --, therefor.

In column 27, line 57, delete "up on" and insert -- upon --, therefor.